United States Patent [19]

Tokushuku et al.

[11] Patent Number: 5,539,710
[45] Date of Patent: Jul. 23, 1996

[54] VIDEO OPTICAL DISK SYSTEM COMPATIBLE WITH BOTH READ ONLY AND WRITABLE OPTICAL DISKS HAVING THE SAME RECORDING FORMAT

[75] Inventors: Nobuhiro Tokushuku, Yokohama; Masaaki Kurebayashi, Ebina; Kouichi Moritani, Yokohama; Hitoshi Yanagihara, Kamakura; Katsuo Konishi, Yokohama; Katsuyuki Tanaka, Kamakura; Yoshihiko Noro, Yokohama; Yoshie Kodera, Chigasaki, all of Japan

[73] Assignee: Hitachi, Ltd., Tokyo, Japan

[21] Appl. No.: 24,359

[22] Filed: Mar. 1, 1993

[30] Foreign Application Priority Data

Feb. 28, 1992 [JP] Japan ................................. 4-042815

[51] Int. Cl.$^6$ ................................................. G11B 17/22
[52] U.S. Cl. .......................................... 369/32; 369/44.26
[58] Field of Search ................................ 369/32, 13, 284, 369/54, 58, 44.26, 44.36, 44.35, 275.3, 111, 279, 44.41; 358/342, 335

[56] References Cited

U.S. PATENT DOCUMENTS

| 4,803,677 | 2/1989 | Yamaguchi et al. | 369/275.3 X |
|---|---|---|---|
| 5,103,436 | 4/1992 | Yajika et al. | 369/32 |
| 5,153,861 | 10/1992 | Maeda et al. | 369/32 |

FOREIGN PATENT DOCUMENTS

| 61-42751 | 3/1986 | Japan . |
|---|---|---|
| 1-128234 | 5/1989 | Japan . |

OTHER PUBLICATIONS

Video Disk and Digital Audio Disk for Beginners, S. Iwamura et al., Corona Publishing Co., LTD, 1982, pp. 122–142.
Video &, H. Takahashi, Jul. 1990 pp. 73–78.

Primary Examiner—Ali Neyzari
Attorney, Agent, or Firm—Antonelli, Terry, Stout & Kraus

[57] ABSTRACT

A video optical disk system which can record/reproduce information in the same recording format as that of a read only type optical disk such as an LD, and is therefore compatible with both the read only type optical disk and a writable optical disk. A writable optical disk exhibiting a C/N ratio of at least 60 [dB] is employed, and has information recorded thereon with the same address signals as those of the LD and in the NTSC direct FM recording format. An optical head and an image processing circuit which are included in a player unit are made common to the recorded disk and the LD, and characteristics of a focusing/tracking control circuit, an RF signal preamplifier circuit and a tilt control circuit which are included in the player unit are changed over on the basis of reflectances of both types of optical disks, thereby enabling both the recorded disk and the LD to be reproduced. The users of the optical disk system can produce original video software by themselves, and can effectively utilize a software stock of read only type optical disks.

17 Claims, 21 Drawing Sheets

VIDEO OPTICAL DISK SYSTEM COMPATIBLE WITH BOTH READ ONLY AND WRITABLE OPTICAL DISKS HAVING THE SAME RECORDING FORMAT

BACKGROUND OF THE INVENTION

1. Field of the Invention

The present invention relates to a recording/reproducing system which uses an optical disk. More particularly, it relates to, for example, an optical disk system which makes it possible to record video software on a writable optical disk, such as of the write once type or the rewritable or erasable type, and to reproduce both the recorded writable optical disk and a read only type optical disk, such as an LD (laser disk), by means of the same player or reproducer.

2. Related Art

VTRs (video tape recorders) employing magnetic tapes form the mainstream of recording/reproducing systems for video images. The VTR has the merit that users thereof can produce video software by themselves.

On the other hand, a recording/reproducing system employing an optical disk is, for example, what is called an "LD system" which uses an LD.

The LD which is commercially available has the video signal, audio signal and control signal of color television recorded on both its surfaces for a program length of one hour to two hours. This LD is fabricated in the following way. First, a stamper is prepared from a photoresist master on which the signals have been recorded. Subsequently, an acrylic resin is extruded using the stamper. A single-sided disk is obtained by coating the resulting acrylic resin plate with a reflective film and a protective film. When two such disks are fastened together, the LD is completed. Incidentally, the recording of the signals on the photoresist master is done as stated below. A video signal and a two-channel audio signal are respectively converted into frequency-modulated signals of unequal carrier frequencies. These signals are simply added, and the resulting signal is shaped into a square wave by a limiter. While an optical modulator is being controlled with the square wave, pits are formed in the surface of the photoresist master. The details of such an LD system are contained in "Guide to Video Disk and DAD" edited by Soichi Iwamura, issued by Corona Publishing Co., Ltd., pp. 122–142.

When compared with the VTR, the optical disk system as stated above has the merits of being easy to randomly access, affording a high picture quality, etc. However, the optical disk in the system is usually a read only type disk, and users of the system have difficulty producing video software by themselves. In order to eliminate the difficulty, write once type and erasable type optical disks have been proposed in "Video α" July 1990, pp 73–78.

Besides, regarding a system for musical CD's (compact disks), a write once type CD which can be reproduced by a CD player or reproducer on the market has been employed, and users of the CD system have already been able to produce CD software by themselves.

With the write once type or erasable type optical disk, users of the optical disk system can produce video software by themselves. Nevertheless, there is the problem that such an optical disk is incompatible with the read only type optical disk because of different recording formats. The compatibility of the write once type or erasable type with the read only type is important in order that users may produce their own video software and that they may effectively utilize a large video software stock of read only type optical disks. Moreover, it would increase the cost of an optical disk player or reproducer whose recording format is different from that of the read only optical disks.

In the case of the write once type CD for musical use, the above problem is eliminated. However, even when this disk is intended to be applied to the video optical disk (LD), a high picture quality as afforded by the LD is not attained on account of a low C/N (carrier-to-noise) ratio.

SUMMARY OF THE INVENTION

An object of the present invention is to realize the recording/reproduction of a writable optical disk in the same recording format as that of a read only type optical disk, thereby providing a video optical disk system which is compatible with the read only type optical disk.

Using a writable optical disk which affords a C/N ratio of at least 60 [dB], the inventors of the present invention have developed a video optical disk system which permits the writable optical disk to be recorded and reproduced in the same recording format as that of the read only type optical disk.

More specifically, the writable optical disk whose C/N ratio is at least 60 [dB] is subjected to the recording in the same address signal format and the same FM (frequency modulation) recording format as those of the read only type optical disk, while the optical head and image processing circuit of a player or reproducer are made common to the read only type optical disk and the writable optical disk, thereby permitting both types of optical disks to be reproduced.

Since the writable optical disk having a C/N ratio of at least 60 [dB] is used, the same degree of high picture quality as that of the read only type optical disk is attained. Thus, the recording and reproduction of images of high picture quality, having heretofore been difficult, are realized on the basis of, for example, the NTSC (National Television System Committee) direct FM recording format. Further, since control codes such as addresses to be recorded on the writable optical disk are set identical to those of the read only type optical disk, the signal format recorded on the writable optical disk becomes the same as on the read only type optical disk, and the image processing circuit of the player can be shared by both types of optical disks. Moreover, unlike a magnetooptical disk, etc., the writable optical disk employed in the present invention is of the type where information is recorded and reproduced in terms of changes in a quantity of reflected light, so that the optical head of the player can be shared by both the writable optical disk and the read only type optical disk.

DETAILED DESCRIPTION OF THE PREFERRED EMBODIMENTS

Now, embodiments of the present invention will be described with reference to the accompanying drawings.

Figure 1:
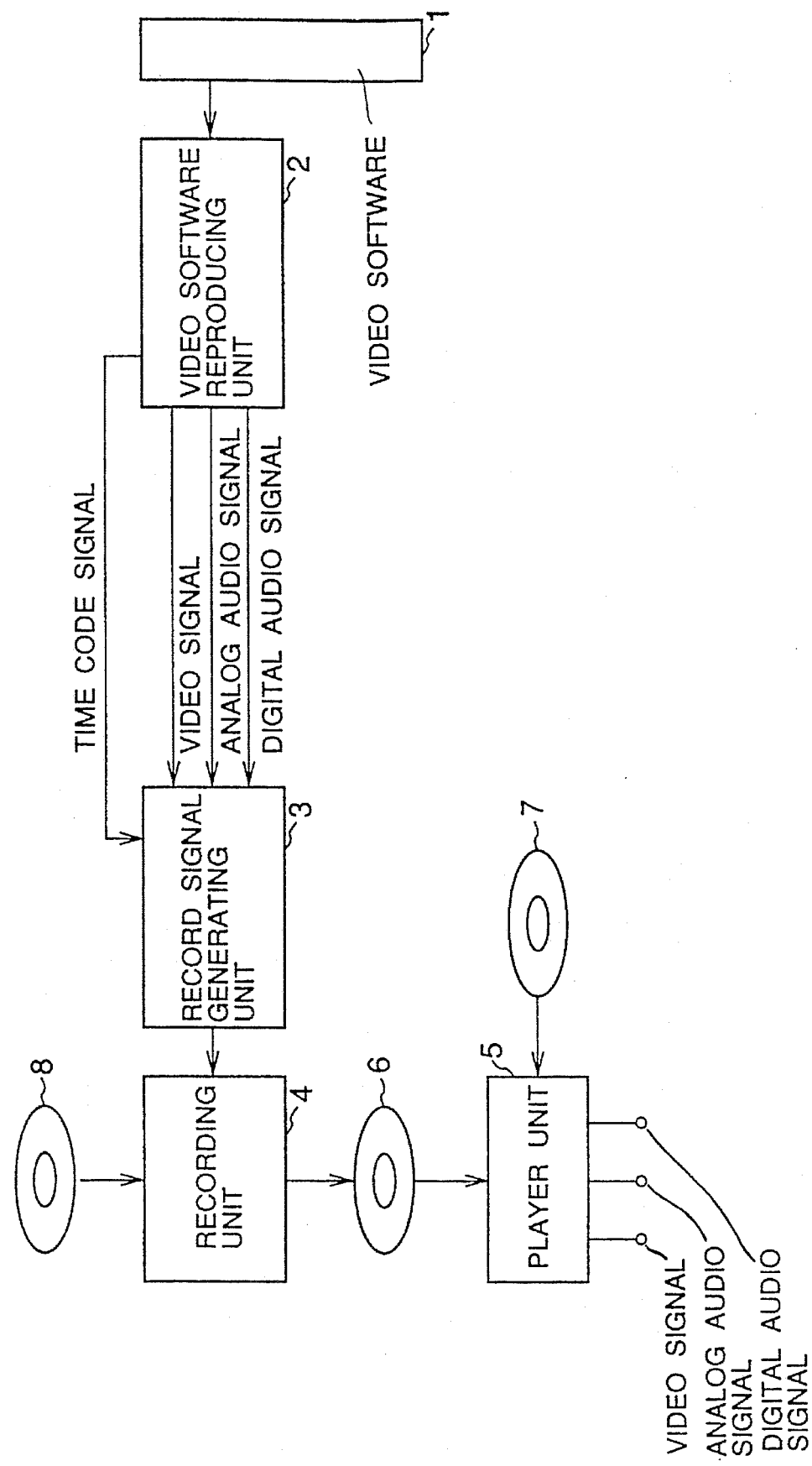
FIG. 1 is a block diagram of essential portions showing an embodiment of an optical disk system according to the present invention.

FIG. 1 illustrates a block diagram of the essential portions of an embodiment of an optical disk system according to the present invention. When broadly divided, the optical disk system of this embodiment comprises video software 1, a video software reproducing unit 2, a record signal generating unit 3, a recording unit 4, and a player or reproducer unit 5. The player unit 5 accepts recorded video and audio signals through a recorded disk 6. Also, the player unit 5 can reproduce a read only type optical disk 7 so as to deliver a video signal and analog and digital audio signals. Incidentally, in a case where a VTR (video tape recorder) for business use or the like adapted to generate a time code signal is employed as the video software reproducing unit 2, the time code signal can be used as required.

When a user possesses the whole system of this embodiment, they can produce the recorded disk 6 containing the video software 1 from a blank or unrecorded disk 8 by themselves. It is also possible as another aspect of performance that a copying service dealer installs the devices of the video software reproducing unit 2 thru the recording unit 4 as a recording center, while a user possesses only the player unit 5. In this case, the user takes the video software 1 to the recording center and obtains the recorded disk 6 produced from the blank disk 8.

The read only type optical disk 7 includes optical disks which record analog signals such as an NTSC (National Television System Committee) signal, a PAL (phase alternation line) signal, a SECAM (Sequentiel Couleur avec Mémoire) signal, a MUSE (multiple sub-Nyquist sample encoding) hi-vision signal and a baseband hi-vision signal. Further, it includes optical disks which record digital video signals. The present invention provides an optical disk system which is compatible with these optical disks of the read only type. In the ensuing description, the read only type optical disk shall be represented by an LD (laser disk) which records the NTSC signal.

Figure 2:
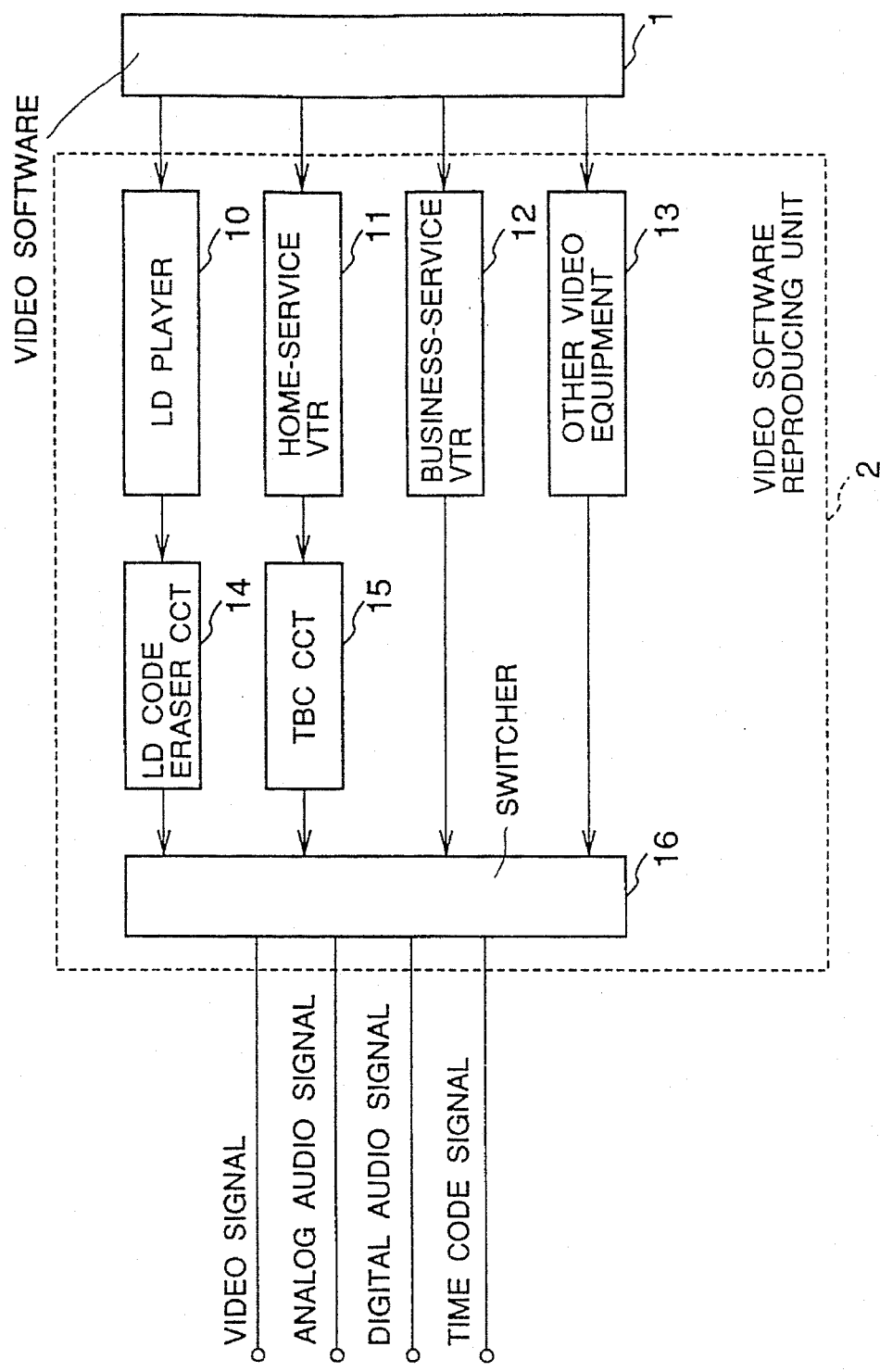
FIG. 2 is a block diagram of video software and a video software reproducing unit which are depicted in FIG. 1.

FIG. 2 illustrates a block diagram of the video software 1 and video software reproducing unit 2 of the optical disk system. In order to cope with various kinds of video software, the video software reproducing unit 2 includes an LD player or reproducer 10, a VTR (video tape recorder) for home use 11, a VTR for business use 12, and other video equipment 13. Of course, only one of the reproducers 10–13 may well be included, but all of them are likely to be included in cases of editing software and rendering a copying service.

In the case of employing the LD player 10 as the reproducer, the reproduced video output thereof contains address signals and control signals which are peculiar to the LD. Since similar signals are added anew at a later stage, an LD code eraser circuit 14 for removing the address and control signals is provided. Besides, in the case of employing the home-service VTR 11 as the reproducer, a video sync signal needs to be corrected by a TBC (time base corrector) circuit 15. A switcher 16 is a device which switches signals from the different reproducers 10–13, and which is effective in the editing operation.

Figure 3:
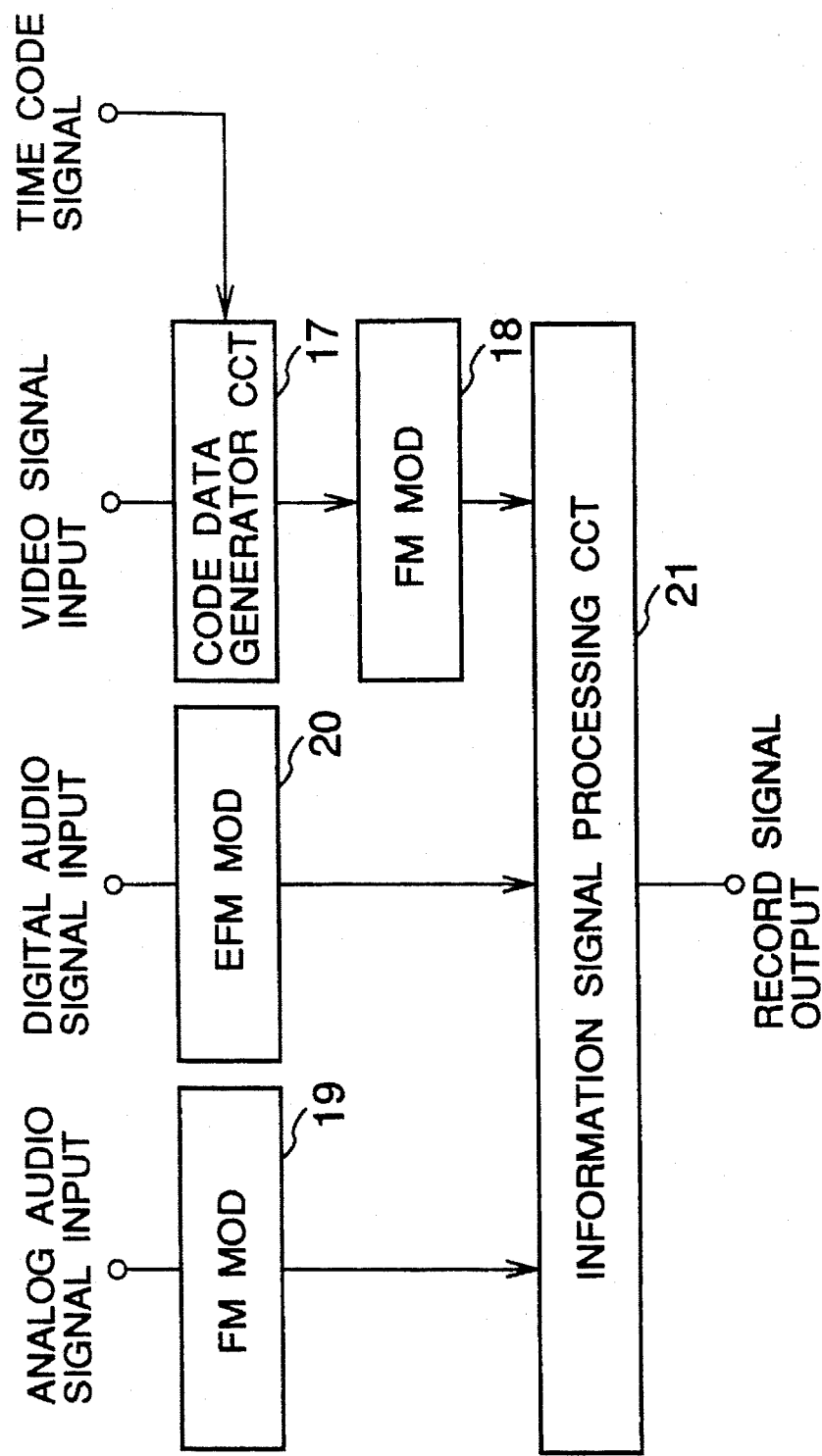
FIG. 3 is a block diagram of a record signal generating unit which is depicted in FIG. 1.

Although a time code signal cannot be generated by the LD player 10 or the home-service VTR 11, it is usually produced by an equipment for business use, such as the business-service VTR 12. Using the time code signal, the record signal generating unit 3 depicted in FIG. 1 can be controlled as explained below FIG. 3 illustrates a block diagram of the record signal generating unit 3 of the optical disk system. A video signal input has the code data of the peculiar address signals and control signals of the LD affixed thereto by a code data generator circuit 17, and the resulting signal is directly subjected to FM (frequency modulation) by an FM modulator 18. Herein, the code data generator circuit 17 can be controlled on the basis of the time code signal. By way of example, let's consider a case where the video software 1 having a length of 10 [minutes] is to be recorded on the blank disk 8. In this case, a time code is registered in the business-service VTR 12 so that the video software 1 may start at 1 [hour] 0 [minute] 0 [second]. Also, the code data generator circuit 17 is set so as to generate a lead-in signal before the time code signal reaches 1 [hour] 0 [minute] 0 [second], to generate the address signals successively from an address-1 signal since the time code signal has reached 1 [hour] 0 [minute] 0 [second], and to generate a lead-out signal after the time code signal has reached 1 [hour] 10 [minutes] 0 [second]. Thus, the code data output from the code data generator circuit 17 can be precisely controlled while the business-service VTR 12 is performing a reproducing operation. Incidentally, the lead-in signal and the lead-out signal are signals which are respectively affixed to the start part and end part of the video software 1.

An analog audio signal input is subjected to FM by an FM modulator 19, while a digital audio signal input is subjected to EFM (eight-to-fourteen modulation) by an EFM modulator 20 in conformity with the signal format of a CD (compact disk). The modulated video signal and the two modulated audio signals are combined and then delivered as a record signal output by an information signal processing circuit 21.

Figure 4:
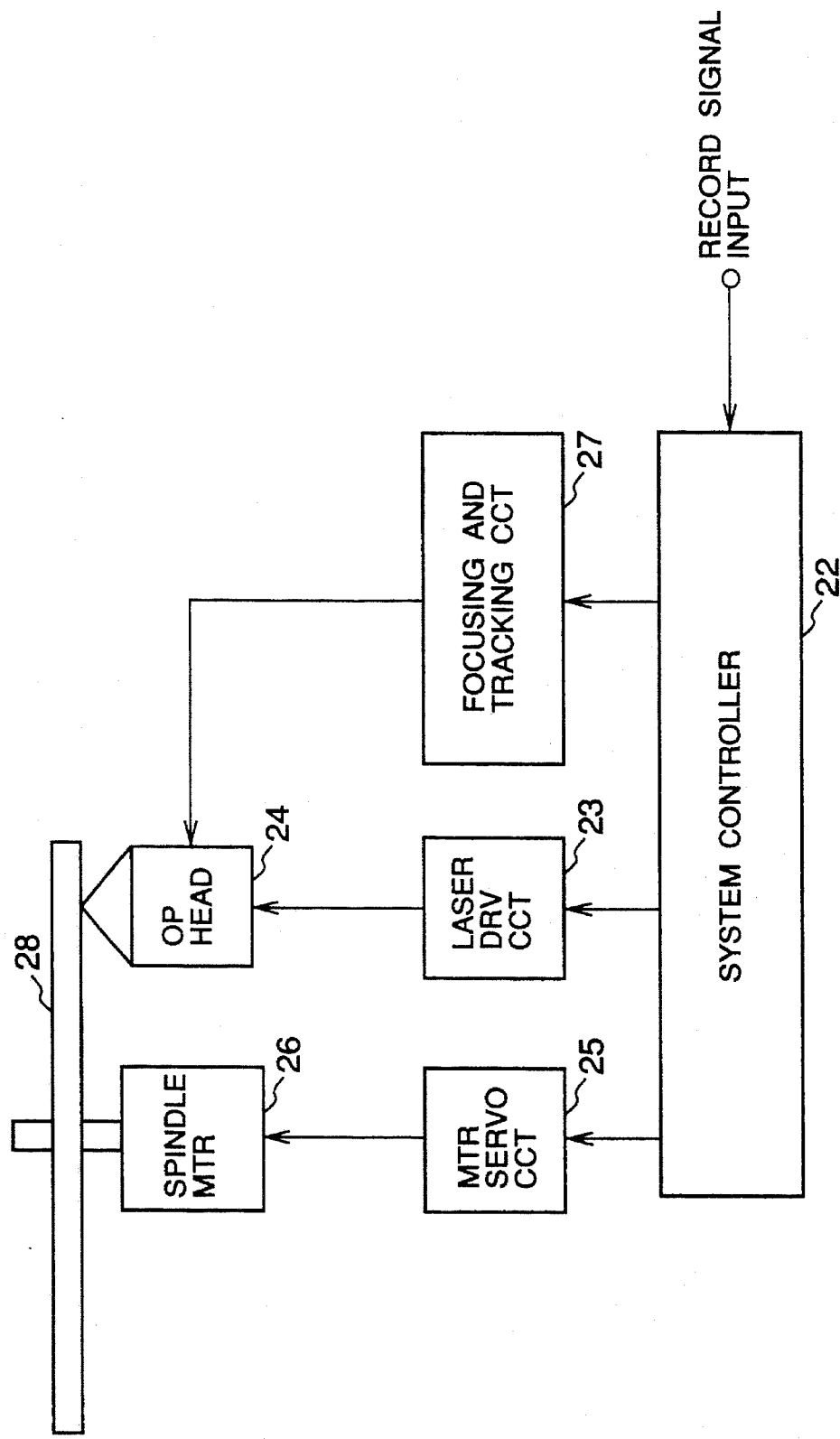
FIG. 4 is a block diagram of a recording unit which is depicted in FIG. 1.

FIG. 4 illustrates a block diagram of the recording unit 4 of the optical disk system. The record signal input from the record signal generating unit 3 is applied to an optical head 24 through a system controller 22 as well as a laser drive circuit 23. In addition, the system controller 22 controls a spindle motor 26 through a motor servo circuit 25 so as to cope with both a CAV (constant angular velocity) disk and a CLV (constant linear velocity) disk. Also, it controls a focusing and tracking circuit 27. A well-known push-pull mode which utilizes the diffraction of light in the groove of an optical disk 28 is employed for tracking.

The optical disk 28 employed here is a writable optical disk of a new type which attains a high C/N (carrier-to-noise) ratio by exploiting the shift of a reflection plane before and after the recording of information on the disk.

Figure 15:
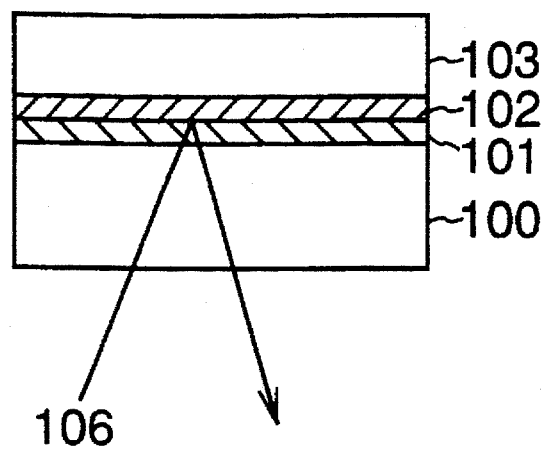
FIG. 15 is a schematic sectional view of the recording layer of the writable optical disk in the unrecorded state thereof.
Figure 16:
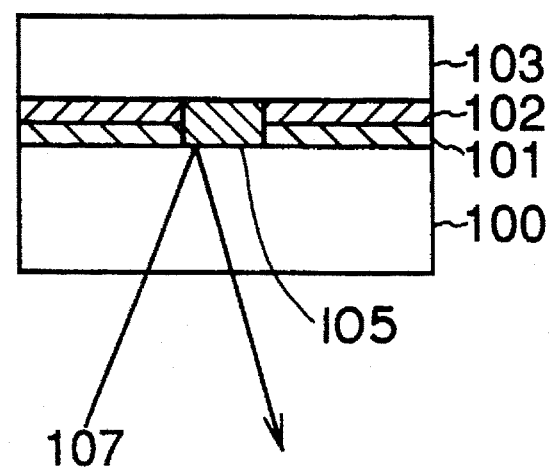
FIG. 16 is a schematic sectional view of the recording layer of the writable optical disk in the recorded state thereof.

FIG. 15 illustrates a schematic sectional view of the optical disk (28 in FIG. 4) in a blank or unrecorded state, while FIG. 16 illustrates a schematic sectional view of the optical disk in a recorded state. The optical disk is such that a transparent substrate 100 is overlaid with a recording layer, which consists of a substantially transparent $Sb_2Se_3$ (antimony triselenide) film 101 and a reflective Bi (bismuth) film 102, and a protective resin layer 103. In a recording mode, the recording layer is heated by irradiation with an intense laser beam and is therefore alloyed into a recorded part 105 in the recorded state. In a reproducing mode, a laser beam 106 projected from the substrate side of the optical disk is chiefly reflected by the lower surface of the reflective Bi film 102 in the blank state of the optical disk because the $Sb_2Se_3$ film 101 is transparent. On the other hand, a laser beam 107 is reflected by the lower surface of the recorded part 105 in the recorded state of the optical disk. Accordingly, the reflection plane of the laser beam is shifted from the surface of the Bi film 102 to that of the recorded part 105 by the recording. The shift of the reflection plane gives rise to a great phase change or shift before and after the recording.

There has heretofore been known the idea that a reflectance change before and after recording is enlarged by turning a dual-film layer into a single-film layer. However, there has not been any known example in which the phase change based on the shift of the reflection plane is utilized as in the optical disk employed in the present invention. As will be detailed below, a high C/N ratio which has not hitherto been attained can be achieved by effectively utilizing the phase change.

More specifically, the high C/N ratio is achieved by exploiting the effect of the interference between the phase change of the recording layer 101, 102 and the phase difference of grooves formed in the substrate 100.

Figure 14:
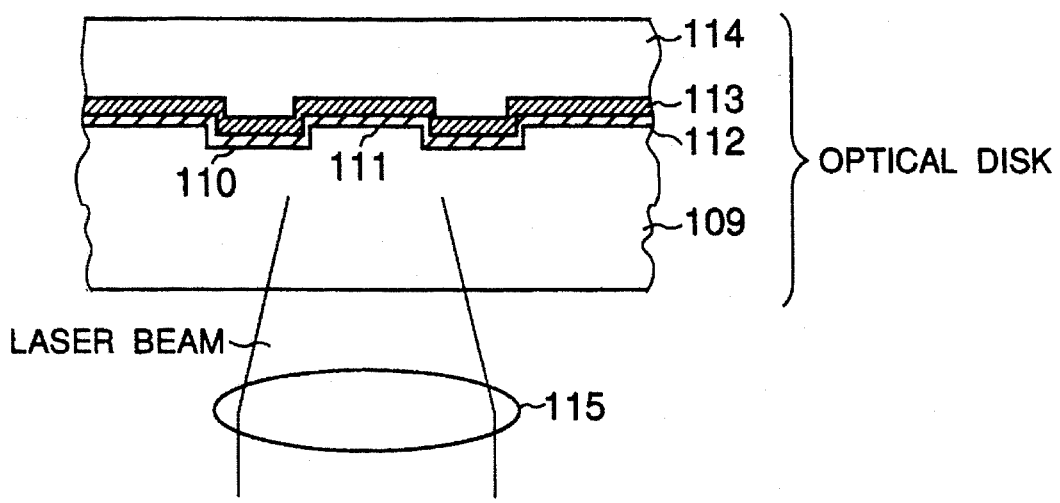
FIG. 14 is a schematic sectional view of a writable optical disk for use in the present invention.

As seen from a schematic sectional view of the optical disk in FIG. 14, the substrate (acrylic resin substrate 109) is formed with the tracking grooves for causing the laser beam to precisely trace the front surface of the disk in the recording mode. A concave part 110 with respect to the substrate 109 is called a "groove", and a convex part 111 is called a "land". It is well known that a phase difference $\phi$ ($=2 \cdot n \cdot d$ where n denotes the refractive index of the substrate 109 and d denotes the depth of the groove 110) is optically induced by the grooves. However, the interference of the phase difference $\phi$ with the phase difference or change of the recording layer (consisting of an $Sb_2Se_3$ film 112 and a Bi film 113) has not hitherto been considered.

The inventors studied the relationship of the interference, and have reached the following conclusion. The phase change of the recording layer arises between a phase in a high reflectance state and a phase in a low reflectance state. Let the symbol $\phi h$ denote a phase in the high reflectance state, and let the symbol $\phi l$ denote a phase in the low reflectance state.

1) When the recording layer satisfies the phase relation of $\phi h > \phi l$, a high signal level can be attained by recording the signal on the land 111.

2) When the recording layer satisfies the phase relation of $\phi h < \phi l$, a high signal level can be attained by recording the signal on the groove 110.

These results can be elucidated as stated below.

The complex reflection coefficient Rh of the recording layer in the high reflectance state and the complex reflection coefficient Rl thereof in the low reflectance state are respectively expressed as:

$$Rh = rh \times \exp(i\ \phi h)$$

$$Rl = rl \times \exp(i\ \phi l)$$

Here, the symbols rh and rl denote amplitude reflection coefficients. The letter i denotes an imaginary number. Besides, in the interference of the phase difference of the recording layer with that of the grooves, the signs of phase terms differ between the operation of recording the signal on the groove 110 and the operation of recording the signal on the land 111.

a) Recording on Groove:

Reflection coefficient of unrecorded part: ri

Reflection coefficient of recorded part: rr×exp (i ($\phi r - \phi i + \phi$))

b) Recording on Land:

Reflection coefficient of unrecorded part: ri

Reflection coefficient of recorded part: rr×exp (i ($\phi r - \phi i - \phi$))

Here, the symbols ri and $\phi i$ denote the amplitude reflection coefficient and phase of the unrecorded part of the recording layer, respectively. The symbols rr and $\phi r$ denote the amplitude reflection coefficient and phase of the recorded part, respectively. The symbol φ denotes the phase difference of the grooves.

Accordingly, i) in a case where the recording layer exhibits a low reflectance before the recording and a high reflectance after the recording, a higher reflectance after the recording provides a greater signal level. In this case, the following holds:

b) Groove recording:

Reflection coefficient of unrecorded part: rl

Reflection coefficient of recorded part: rh×exp (i (φh−φl+φ))

a) Land recording:

Reflection coefficient of unrecorded part: rl

Reflection coefficient of recorded part: rh×exp (i (φh−φl−φ))

Thus, a higher reflectance is obtained when the phase terms after the recording are closer to zero. From this condition, therefore, it is understood that for attaining a high signal level, the land recording is better for φh−φl>0, namely, for φh>φl, whereas the groove recording is better for φh−φl<0, namely, for φh<φl.

In contrast to the above case i), ii) in a case where the recording layer exhibits a high reflectance before the recording and a low reflectance after the recording, a lower reflectance after the recording provides a greater signal level. In this case, the following holds:

b) Groove recording:

Reflection coefficient of unrecorded part: rh

Reflection coefficient of recorded part: rl×exp (i (φl−φh+φ))

a) Land recording:

Reflection coefficient of unrecorded part: rh

Reflection coefficient of recorded part: rl×exp (i (φl−φh−φ))

Thus, a lower reflectance is obtained when the phase terms after the recording are further from zero. From this condition, therefore, it is understood that for attaining a high signal level, the land recording is better for φl−φh<0, namely, for φh>φl, whereas the groove recording is better for φl−φh>0, namely, for φh<φl.

In this manner, it has been revealed that the relations 1) and 2) mentioned above hold true.

As thus far explained, the optical disk employed in the present invention utilizes the effect of the interference between the phase difference or change of the recording layer before and after the recording and the phase difference of the grooves. It provides a high C/N ratio of at least 60 [dB] in a wide frequency band. Accordingly, even when the NTSC signal is directly subjected to the FM and then recorded on the optical disk, it deteriorates little, and the optical disk can be recorded in the same signal format as in the conventional LD.

Referring back to the schematic sectional view of FIG. 14, an example of the writable optical disk in the present invention is constructed such that the recording layer, which is made of a dual-film structure consisting of an $Sb_2Se_3$ film 112 having a thickness of 30 [nm] and a Bi film 113 having a thickness of 25 [nm], and a protective film 114, which is made of an ultraviolet-setting resin, are formed on the acrylic resin substrate 109 which is provided with grooves 110 each having a width of 0.7 [μm] and a depth of ⅛ (where λ denotes the wavelength of the laser beam to be used) and lying at pitches of 1.6 [μm]. Since this example of the optical disk satisfies the condition of φh>φl, the signal is recorded on the lands 111 (the parts between adjacent grooves 110) by the use of a laser beam passing through an objective lens 115. Thus, a high C/N ratio of 60 [dB] (at a signal frequency of 8 [MHz] and a noise band of 30 [kHz]) is achieved by utilizing the effect of the interference between the phase difference of the grooves and the phase difference of the recording layer before and after the recording.

Further, unlike a magneto-optical disk where the change of a Kerr rotation angle is detected, the optical disk in the present invention has its signal detected in terms of a change of a quantity of reflected light. Therefore, the same optical head as that of the LD can be used for the optical disk.

Figure 5:
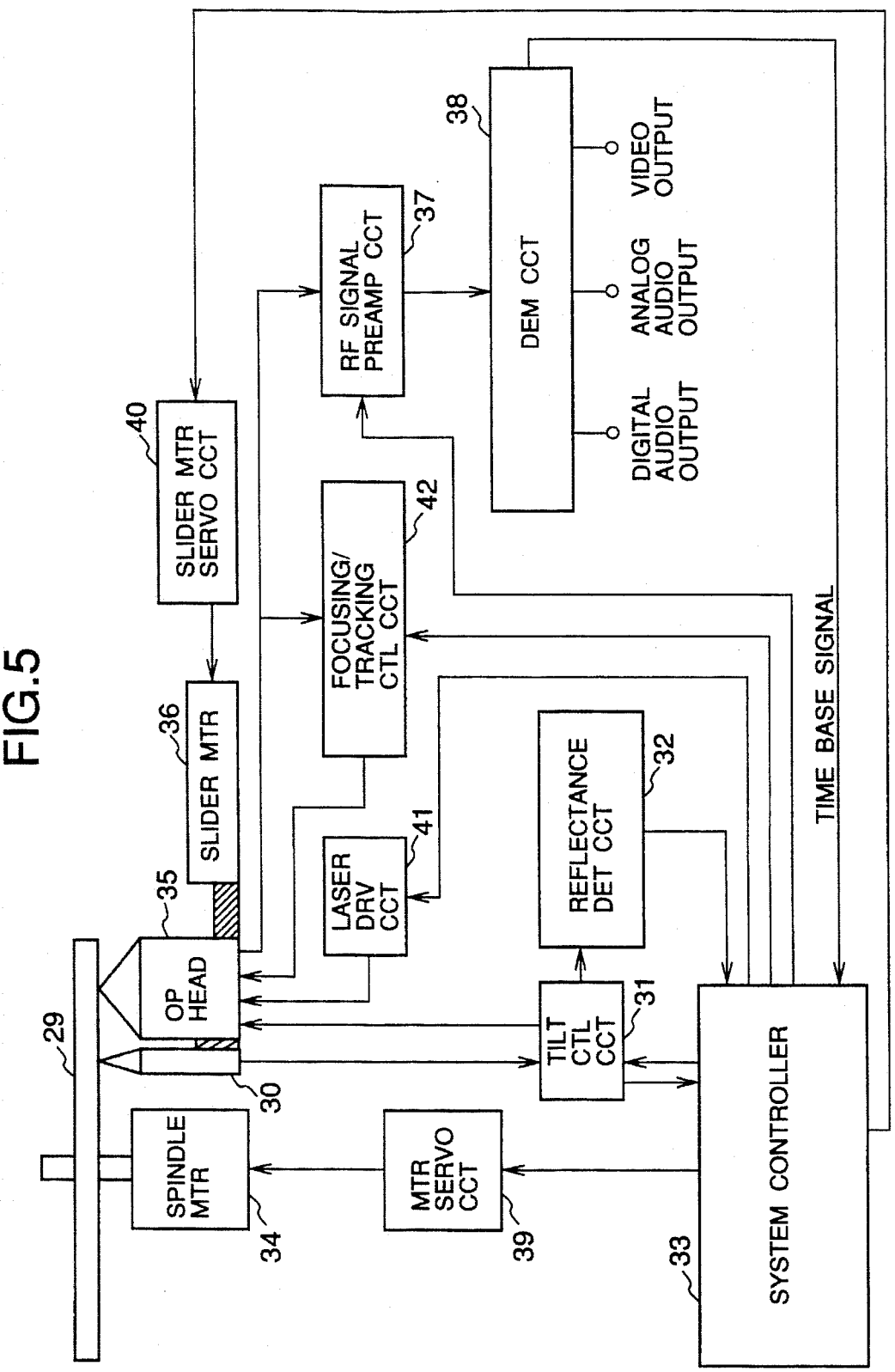
FIG. 5 is a block diagram of a player unit which is depicted in FIG. 1.

FIG. 5 illustrates a block diagram of the player or reproducer unit 5 of the optical disk system shown in FIG. 1. The recorded disk 6 prepared from the optical disk differs from the LD (read only type disk) 7 in the following points:

1) The reflectance of the recorded disk 6 is 20~30 [%] and is lower than that of the LD 7. (The reflectance of the LD is about 70 [%].)

2) In the recorded disk 6, the reflectance of a guard band part is lower than that of a recording track part. (In the LD, the reflectance of a guard band part is higher.)

More specifically, the writable optical disk shown in FIG. 14 exhibits a reflectance of approximately 10 [%] in the unrecorded state and a reflectance of approximately 30 [%] in the recorded state. These values are lower than the reflectance of the LD. In addition, the reflectance of the recording track part of the optical disk becomes high, and the guard band part between the adjacent recording tracks remains unrecorded and exhibits low reflectance. Therefore, the polarity of tracking for the optical disk is opposite to that for the LD.

Accordingly, the player unit 5 for reproducing both the LD (read only type disk) 7 and the recorded disk 6, which has been obtained by recording the information on the writable optical disk, must cope with the aforementioned differences. That is, it is necessary to change over gains in correspondence with the unequal reflectances and also to change over the tracking polarities.

Referring to FIG. 5, the reflectance of an optical disk 29 (either the recorded disk 6 or the read only type disk 7) is detected by a reflectance detection circuit 32 to which the output of a tilt sensor 30 is sent through a tilt control circuit 31, and from which a disk identification signal is sent to a system controller 33. On the other hand, the signal recorded on the optical disk 29 which is rotated by a spindle motor 34 is detected by an optical head 35. The optical head 35 is positioned by a slider motor 36, and it irradiates the optical disk 29 with a semiconductor laser beam and detects reflected light from the optical disk. The reflected light detection signal of the optical head 35 is supplied to a focusing/tracking control circuit 42 and an RF (radio-frequency) signal preamplifier circuit 37. In accordance with the disk identification signal from the reflectance detection circuit 32, the system controller 33 changes over the focusing/tracking control circuit 42, RF signal preamplifier circuit 37 and tilt control circuit 31 as will be explained in conjunction with FIGS. 7~10.

Since the circuits 42, 37 and 31 are respectively changed over for each of the two types of optical disks, the objective lens (not shown) of the optical head 35 is normally pulled into a focusing position, and a tracking servo comes to operate normally. Also, the RF signal output level of the preamplifier 37 becomes an appropriate value. Thus, the video signal output, the digital or analog audio output and the time base signal as predetermined are produced by a demodulation circuit 38. Besides, the tilt control circuit 31 controls the laser beam projection angle of the optical head 35 in accordance with the tilt or inclination of the optical disk 29. Since this circuit 31 is also changed over for each of the two types of optical disks, a precise tilt control can be performed.

While monitoring the time base signal, the system controller 33 sends control signals to a motor servo circuit 39 and a slider motor servo circuit 40 so as to control the rotation of the spindle motor 34 and the slider motor 36, respectively.

According to the player unit 5 of this embodiment, both the LD 7 and the recorded disk 6 are permitted to be reproduced merely by additionally providing the reflectance detection circuit 32 in a conventional LD player and changing over the focusing/tracking control circuit 42, RF signal preamplifier circuit 37 and tilt control circuit 31. Almost all parts including the optical head 35 and the demodulation circuit 38 can be made common to those of the LD player. Therefore, a compatible player unit of low price can be realized.

Figure 6:
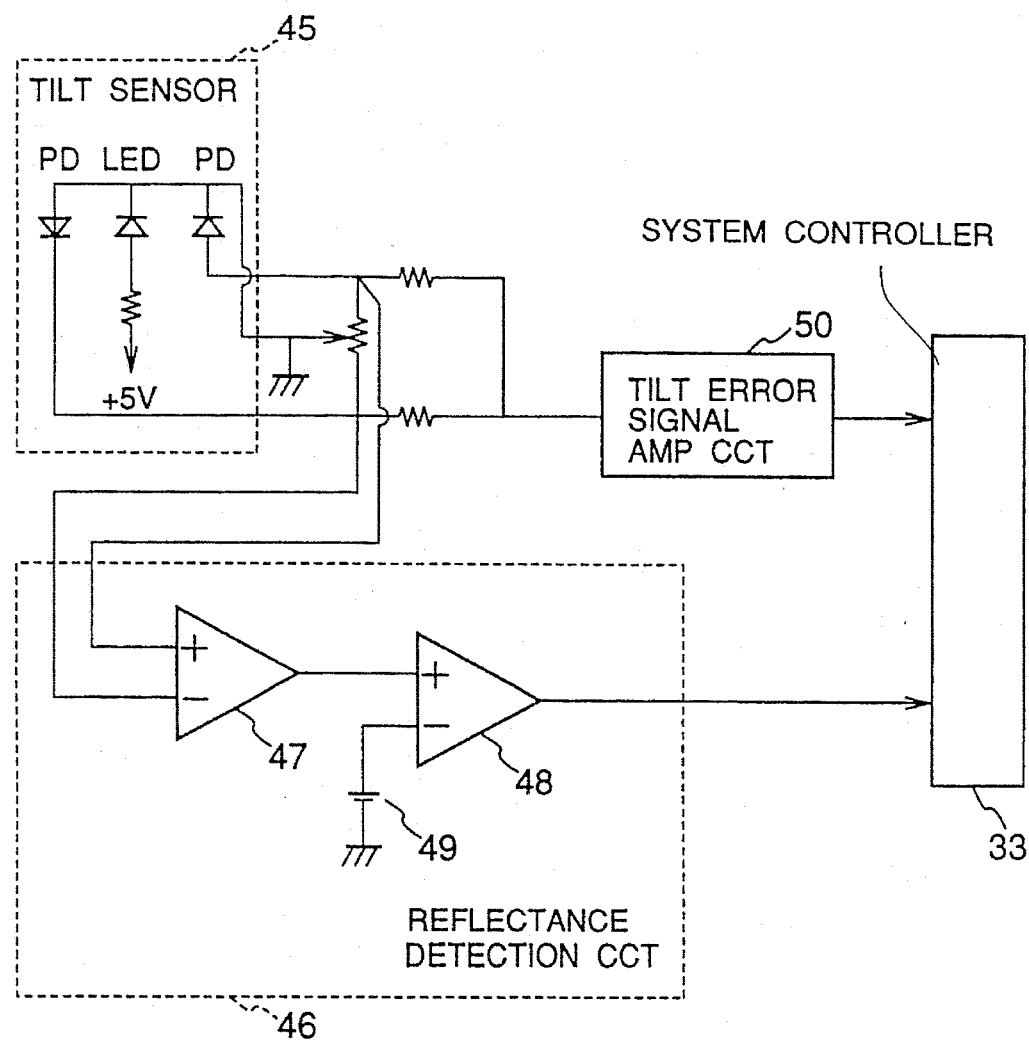
FIG. 6 is a circuit diagram showing an example of the reflectance detection circuit of the player unit for use in the optical disk system of the present invention.

FIG. 6 shows an example of a tilt sensor 45 (30 in FIG. 5), a tilt error signal amplifier circuit 50 of the tilt control circuit (31), and a reflectance detection circuit 46 (32) which are part of the player unit 5 shown in FIG. 5. The tilt sensor 45 includes an LED (light emitting diode) and two PD's (photodiodes). A light beam emitted from the LED is reflected by the optical disk (29 in FIG. 5), and the reflected light reaches the two PD's. When the optical disk is tilted or slanted, the intensities of the light reaching the respective PD's differ, thereby producing a tilt error signal. Accordingly, a tilt motor (not shown) is controlled so as to minimize the error signal, whereby the optical head (35) is brought to its optimum position. The reflectance detection circuit 46 identifies the type of optical disk by adding the outputs of the two PD's of the tilt sensor 45 with a differential amplifier 47, and comparing the output of the differential amplifier 47 with a reference voltage 49 in a comparator 48. More specifically, the LD (7 in FIG. 1) exhibits a high reflectance, while the recorded disk (6) exhibits a low reflectance. Therefore, the reference voltage 49 is set at a level substantially midway between the output level of the differential amplifier 47 in the case of the LD and that in the case of the recorded disk. Thus, the high-level output of the comparator 48 is sent to the system controller 33 in the case of the LD, while the low-level output of the comparator 48 is sent in the case of the recorded disk.

Although the two PD outputs are used for the reflectance detection in this embodiment, only the PD output on one side may be used.

Figure 7:
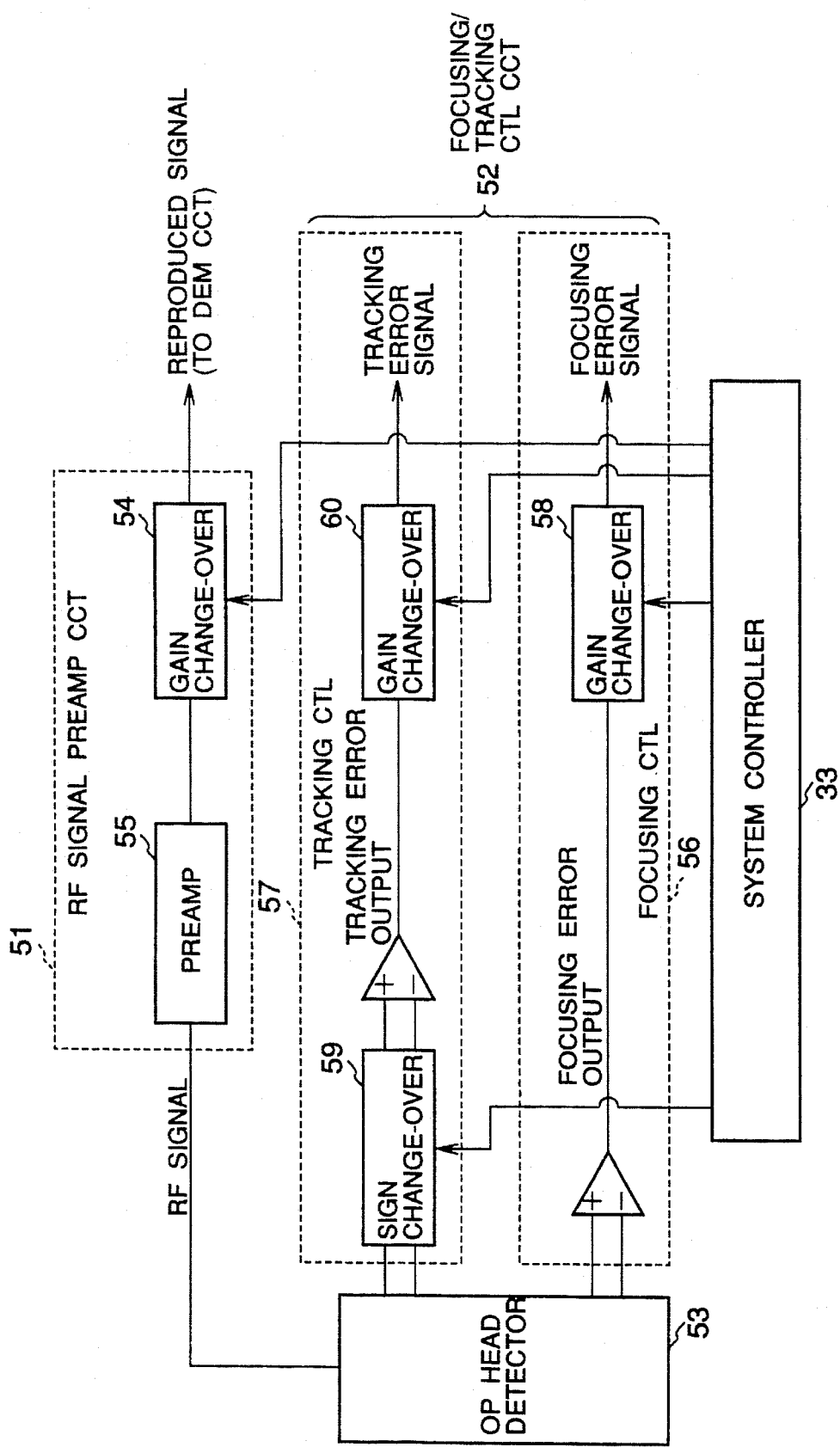
FIG. 7 is a circuit block diagram showing examples of the RF (radio-frequency) signal preamplifier circuit and focusing/tracking control circuit of the player unit for use in the optical disk system of the present invention.

FIG. 7 shows an example of an RF signal preamplifier circuit 51 (37 in FIG. 5) and a focusing/tracking control circuit 52 (42) which are part of the player unit 5 shown in FIG. 5. Here, an optical head detector 53 is a photodetector which is disposed in the optical head (35 in FIG. 5). The focusing signal, tracking signal, RF signal, etc., of the optical disk (29 in FIG. 5) are detected by the optical head detector 53.

In the RF signal preamplifier circuit 51, under the command of the system controller 33, a gain change-over circuit 54 is operated to increase an output of a preamplifier 55 when the recorded disk (6 in FIG. 1) is to be reproduced, whereas the gain change-over circuit 54 is not operated and the output of the preamplifier 55 is directly sent to the demodulation circuit (38 in FIG. 5) as a reproduced signal when the LD (7 in FIG. 1) is to be reproduced.

A focusing control portion 56 included in the focusing/tracking control circuit 52 is controlled in accordance with the command of the system controller 33 similarly to the RF signal preamplifier circuit 51. When the recorded disk is to be reproduced, a gain change-over circuit 58 is operated to increase a focusing error output to produce a focusing error signal, and when the LD is to be reproduced, the gain change-over circuit 58 is not operated and the focusing error output is directly output as the focusing error signal.

Also, a tracking control portion 57 included in the focusing/tracking control circuit 52 is controlled in accordance with the command of the system controller 33. When the recorded disk is to be reproduced, the polarity of the tracking is changed over by a sign change-over circuit 59, and simultaneously a tracking error output is increased to produce a tracking error signal by a gain change-over circuit 60. On the other hand, when the LD is to be reproduced, neither the change-over of the polarity nor that of the gain is performed.

Figure 8:
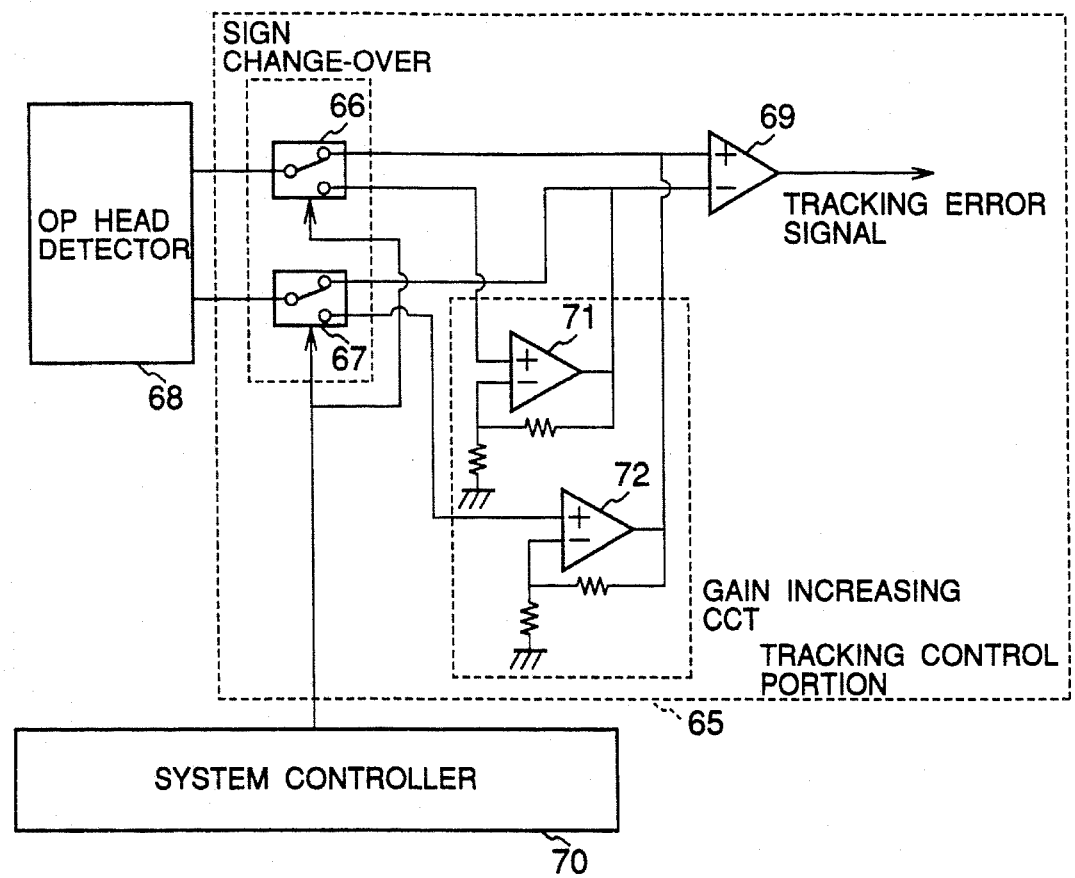
FIG. 8 is a circuit diagram showing an example of the tracking control circuit of the player unit for use in the optical disk system of the present invention.

FIG. 8 shows an example of a circuit arrangement of a tracking control portion 65 (57 in FIG. 7) included in the focusing/tracking control circuit (52). In this example, in the case of the LD (7 in FIG. 1), both of sign change-over switches 66 and 67 are switched to the up position, and the signals from the optical head detector 68 (53 in FIG. 7) are directly input to a differential amplifier 69, thereby obtaining the tracking error signal. On the other hand, in the case of the recorded disk (6 in FIG. 1), both of the sign change-over switches 66 and 67 are switched to the down position, the signals from the optical head detector 68 are amplified by two amplifiers 71 and 72 with their signs being inverted, and the resulting signals are input to the differential amplifier 69. Thus, according to this example, both the LD and the recorded disk can be coped with merely by changing over both the switches 66 and 67 of a sign change-over switch assembly by means of a system controller 70 (33 in FIG. 7).

Figure 9:
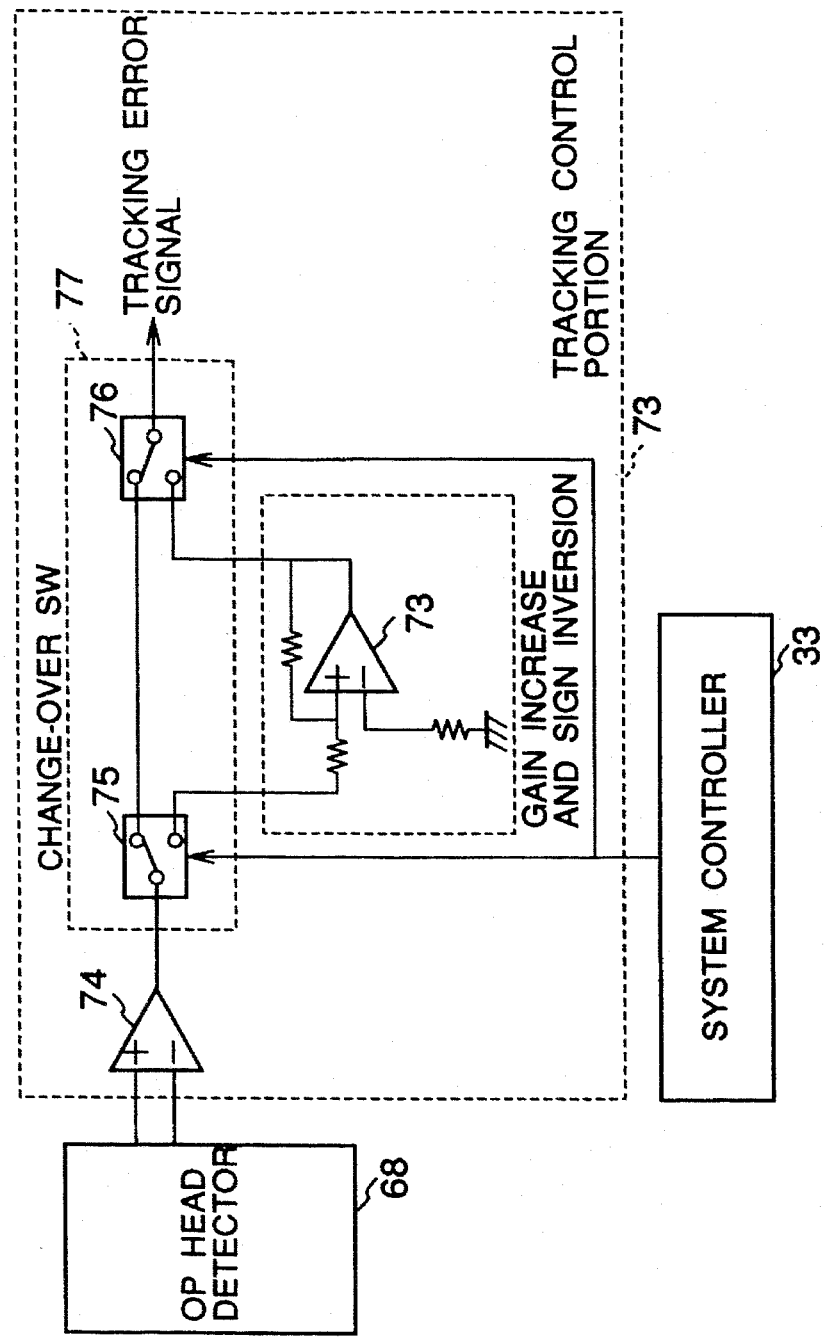
FIG. 9 is a circuit diagram showing another example of the tracking control circuit of the player unit for use in the optical disk system of the present invention.

FIG. 9 shows another example of a circuit arrangement of a tracking control portion 73 (57 in FIG. 7) included in the focusing/tracking control circuit (52). In this example, the sign change-over and the gain change-over (gain increase) in the case of the recorded disk (6 in FIG. 1) are simultaneously performed. That is, the sign inversion and the signal amplification are simultaneously performed using an inverting amplifier 73. Change-over switches 75 and 76 and the inverting amplifier 73 are disposed on the output side of a differential amplifier 74 connected to the optical head detector 68 (53 in FIG. 7). In the case of the recorded disk, both the switches 75 and 76 of a change-over switch assembly 77 are switched to the down position by the command of the system controller 33, whereby the sign inversion and the gain increase are simultaneously effected. Thus, according to this example, the single amplifier 73 suffices for the amplification.

Figure 10:
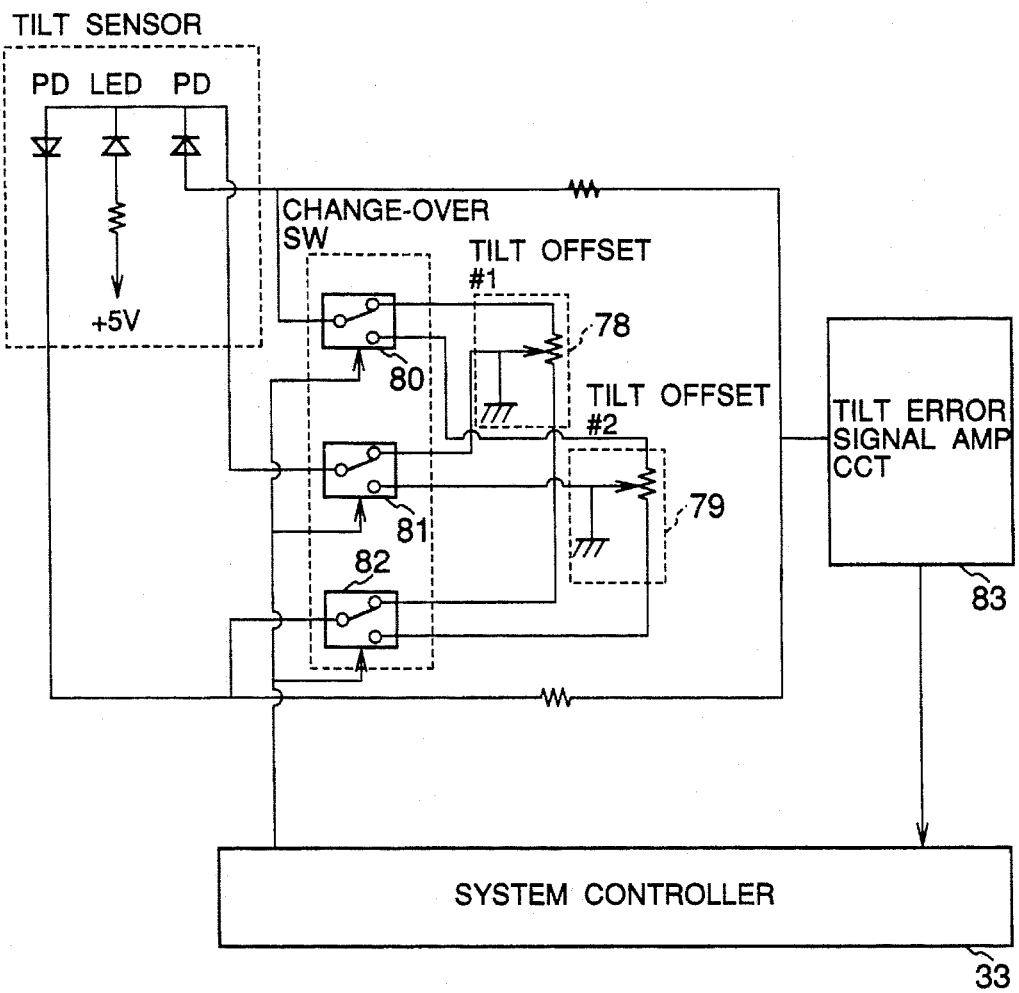
FIG. 10 is a circuit diagram showing an example of the tilt control circuit of the player unit for use in the optical disk system of the present invention.

FIG. 10 illustrates a part of the tilt control circuit 31 shown in FIG. 5. An important function within the tilt control circuit 31 is tilt offset. The tilt offset function serves to balance the two PD outputs. Since, however, the position of the balance differs depending upon the reflectance of the optical disk (29 in FIG. 5), two tilt offset circuits 78 and 79 (tilt offset circuit #1 and tilt offset circuit #2), each of which is constructed of a variable resistor, are provided. The variable resistor of the tilt offset circuit #1 is set so as to optimize the balance of the two PD outputs in the case of the LD (7 in FIG. 1), while the variable resistor of the tilt offset circuit #2 is set so as to optimize the balance of the two PD outputs in the case of the recorded disk (6).

When the LD is to be reproduced, three change-over switches 80, 81 and 82 of a change-over switch circuit are switched to the up position by the command of the system controller 33 so as to operate the tilt offset circuit #1. On the other hand, when the recorded disk is to be reproduced, the three change-over switches 80, 81 and 82 of the change-over switch circuit are switched to the down position by the command of the system controller 33 so as to operate the tilt offset circuit #2. Further, if necessary, the gain of a tilt error signal amplifier circuit 83 also be changed over.

Figure 11:
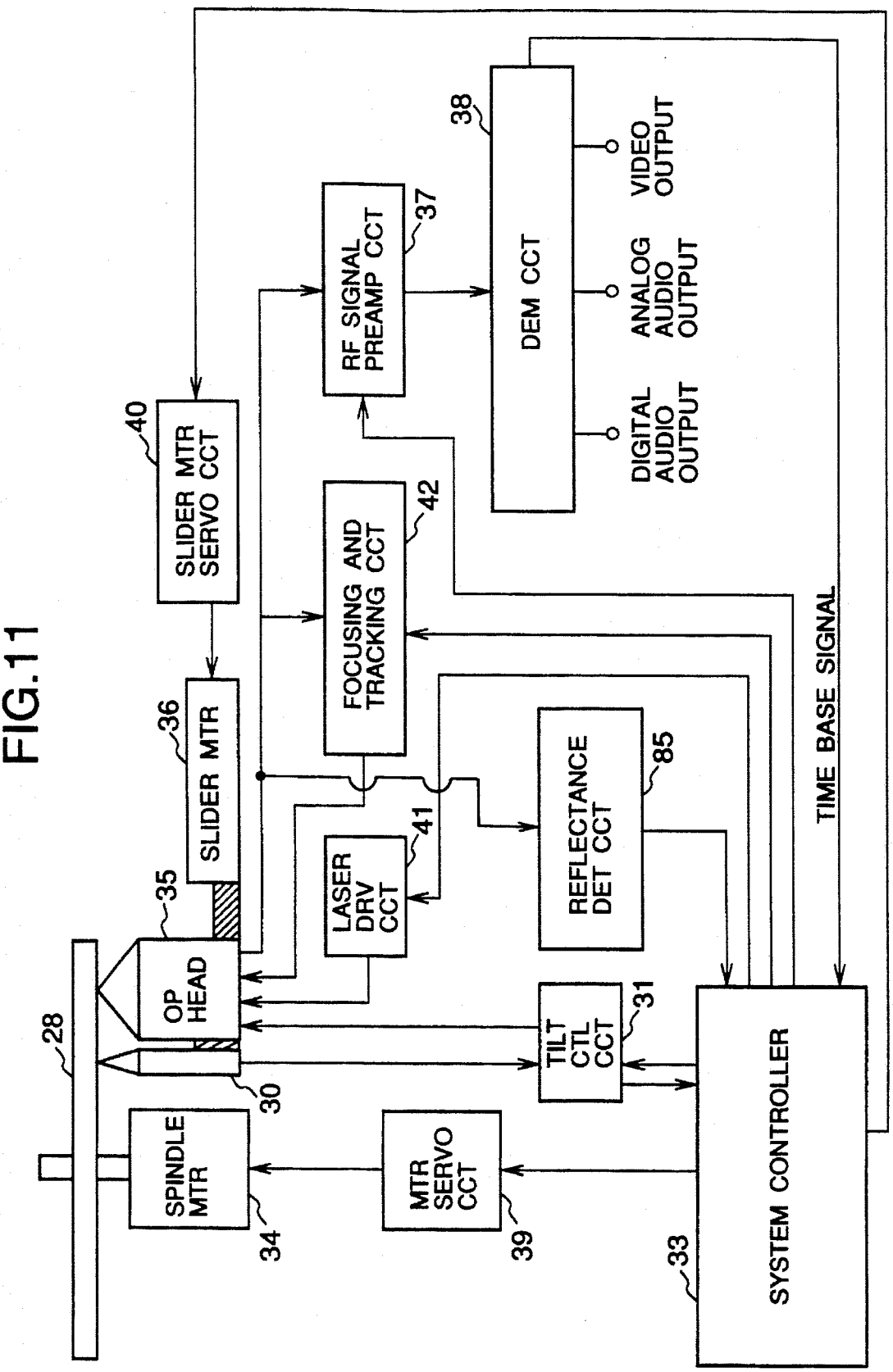
FIG. 11 is a block diagram showing another example of the player unit for use in the optical disk system of the present invention.

FIG. 11 illustrates another example of the player or reproducer unit 5 shown in FIG. 1. In this example, a reflected light detection signal from an optical head 35 is used as the input signal of a reflectance detection circuit 85. The other points are the same as in the foregoing example depicted in FIG. 5.

Figure 12:
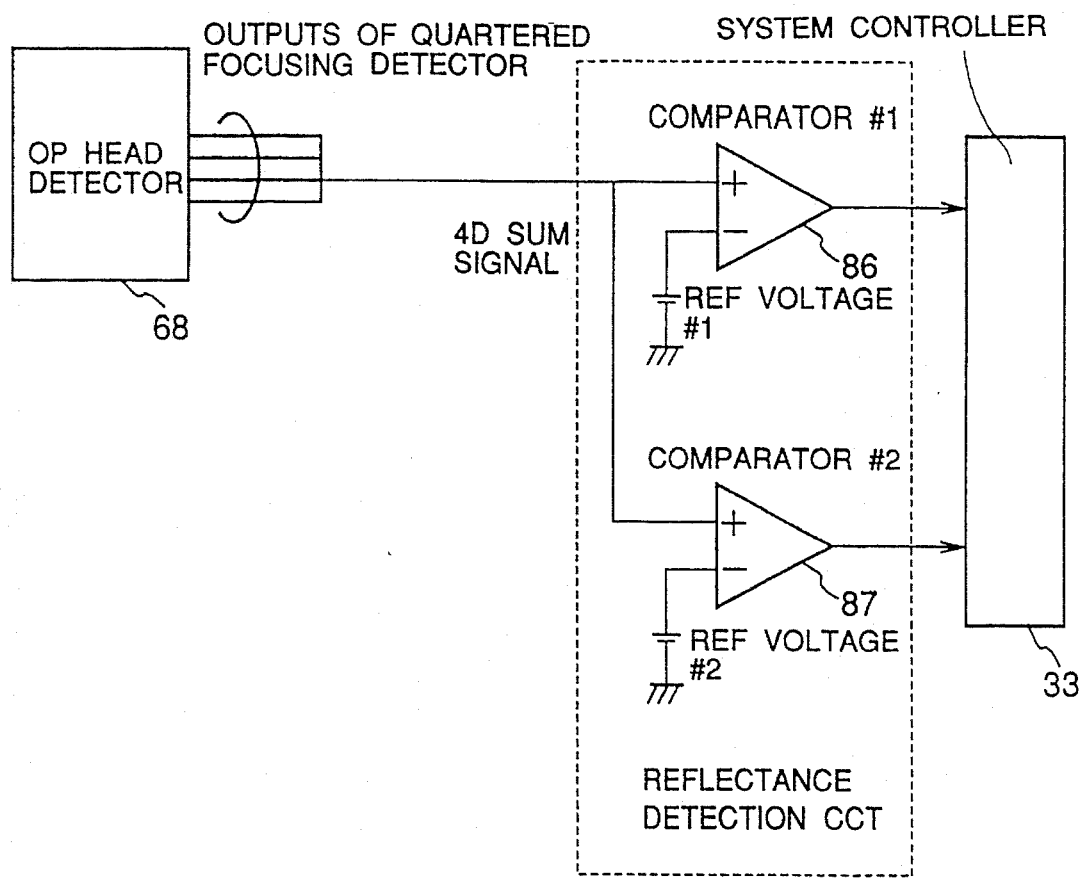
FIG. 12 is a circuit diagram showing an example of a reflectance detection circuit which is depicted in FIG. 11.

FIG. 12 illustrates an example of a circuit arrangement of the reflectance detection circuit 85 of the player unit 5 shown in FIG. 11. In this example, the magnitude of a sum signal (4D sum signal) of outputs from a quartered focusing detector is detected by two comparators 86 and 87. More specifically, a reference voltage #1 of a comparator #1 (86) is set to be intermediate between the 4D sum signal level of the LD (7 in FIG. 1) and that of the recorded disk (6 in FIG. 1), while a reference voltage #2 of a comparator #2 (87) is set to be intermediate between the 4D sum signal level of the recorded disk and that in the absence of any optical disk. When, under the set conditions, the outputs of the comparators #1 and #2 are both at a high level, the system controller 33 identifies the optical disk to be the LD. In addition, when the outputs of the comparators #1 and #2 are at a low level and at a high level, respectively, the system controller 33 identifies the optical disk to be the recorded disk. Finally, when the outputs of the comparators #1 and #2 are both at a low level, the system controller 33 identifies the absence of any optical disk.

In the recorded disk (6 in FIG. 1) of the above embodiment, the reflectance of the guard band parts is set low so as to reduce the noise level. However, the polarity inversion of the tracking can be dispensed with if, for example, two recording beams are used for recording the information on the blank or unrecorded disk (8 in FIG. 1) and simultaneously subjecting the guard band parts to DC (direct current) recording (a method of recording without modulating the recording beam). A signal can also be recorded on these guard band parts before or after the preparation of the recorded disk. When the polarity inversion of the tracking is dispensed with, the two types of optical disks can be coped with merely by changing over the gains and offsets as stated before. If a disk having a still higher C/N ratio is developed in the future, such a measure will become very effective.

Figure 13:
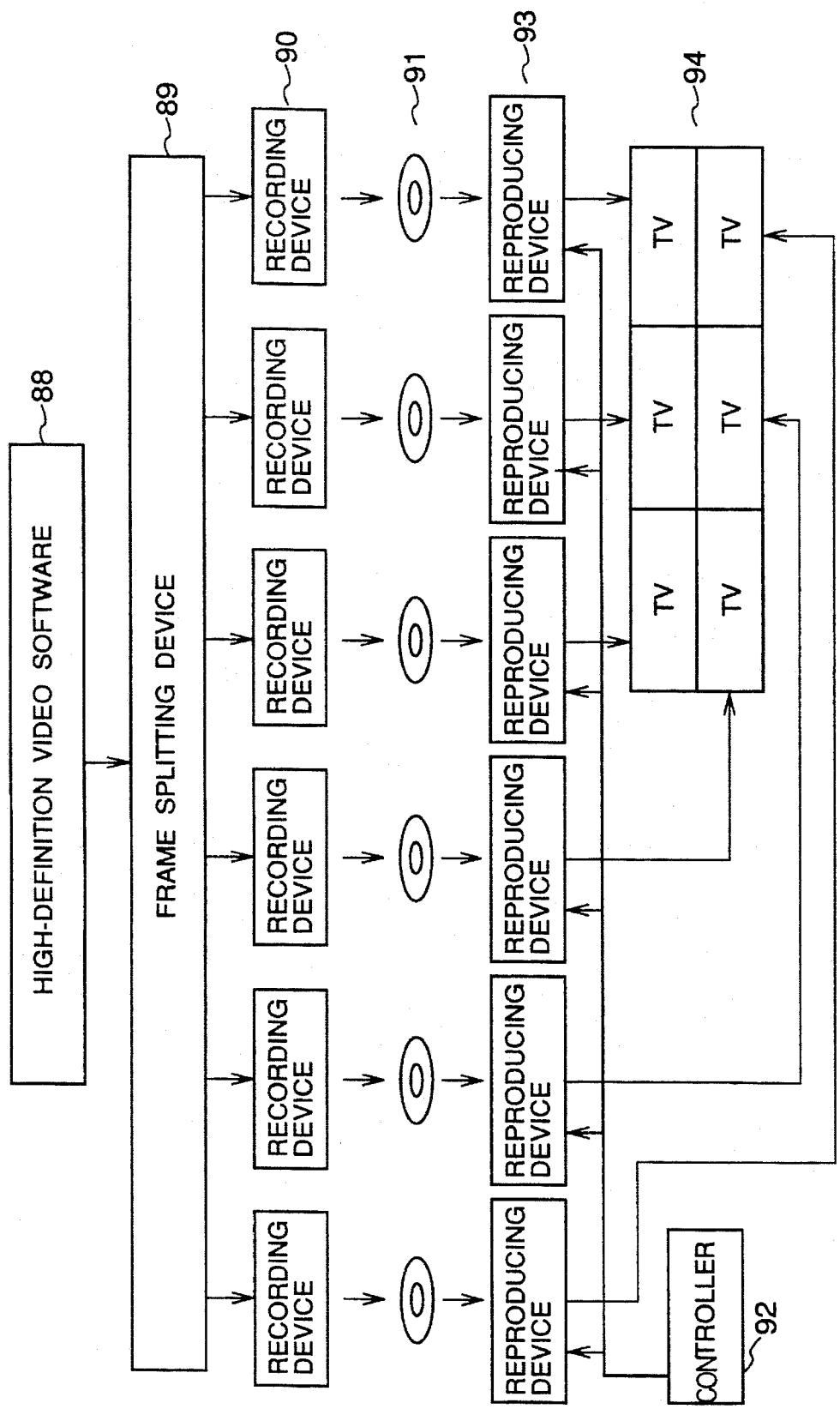
FIG. 13 is a block diagram of essential portions showing another embodiment of the optical disk system according to the present invention.

FIG. 13 illustrates an embodiment of a multiple video system in which high-definition video software is projected onto a multi-screen video system at a high picture quality by the use of a plurality of systems as shown in FIG. 1. In this embodiment, a hi-vision signal of high-definition software 88 is divided into NTSC signals for six frames by a frame splitting device 89. The NTSC signals for the six frames are recorded on respective blank or unrecorded disks (8 in FIG. 1) by corresponding recording devices 90 (each of which includes the record signal generating unit 3 and the recording unit 4 depicted in FIG. 1). Then, six recorded disks 91 having different recorded contents are obtained. The recorded disks 91 are simultaneously reproduced by corresponding reproducing devices 93 (each of which is the player unit 5 depicted in FIG. 1) under the control of a controller 92. Reproduced signals from the reproducing devices 93 are displayed by a six-screen high-definition video system. Incidentally, it has been proposed to construct a similar recording/reproducing system using LD's. However, a time period of 10 days or longer is expended in fabricating the LD's, and it is also difficult to simultaneously record signals on the six LD's. The embodiment illustrated in FIG. 13 has the merit that the recorded disks 91 can be obtained simultaneously in real time, and it is most suited to users with limited time periods for various shows, fairs, etc. Although the six disks having the different contents are simultaneously recorded in this embodiment, recording operations may also be repeated six times with s single recording device 90. It is needless to say that, in this case, the recording time period simply becomes six times longer.

In each of the above embodiments, the read only type disk and the writable disk (of the write once type or the erasable type) are identified, and the gains and the tracking polarities are changed over in accordance with the respective disks. Now, there will be described another embodiment of the present invention concerning an optical disk reproducing system of a more general form.

Figure 17:
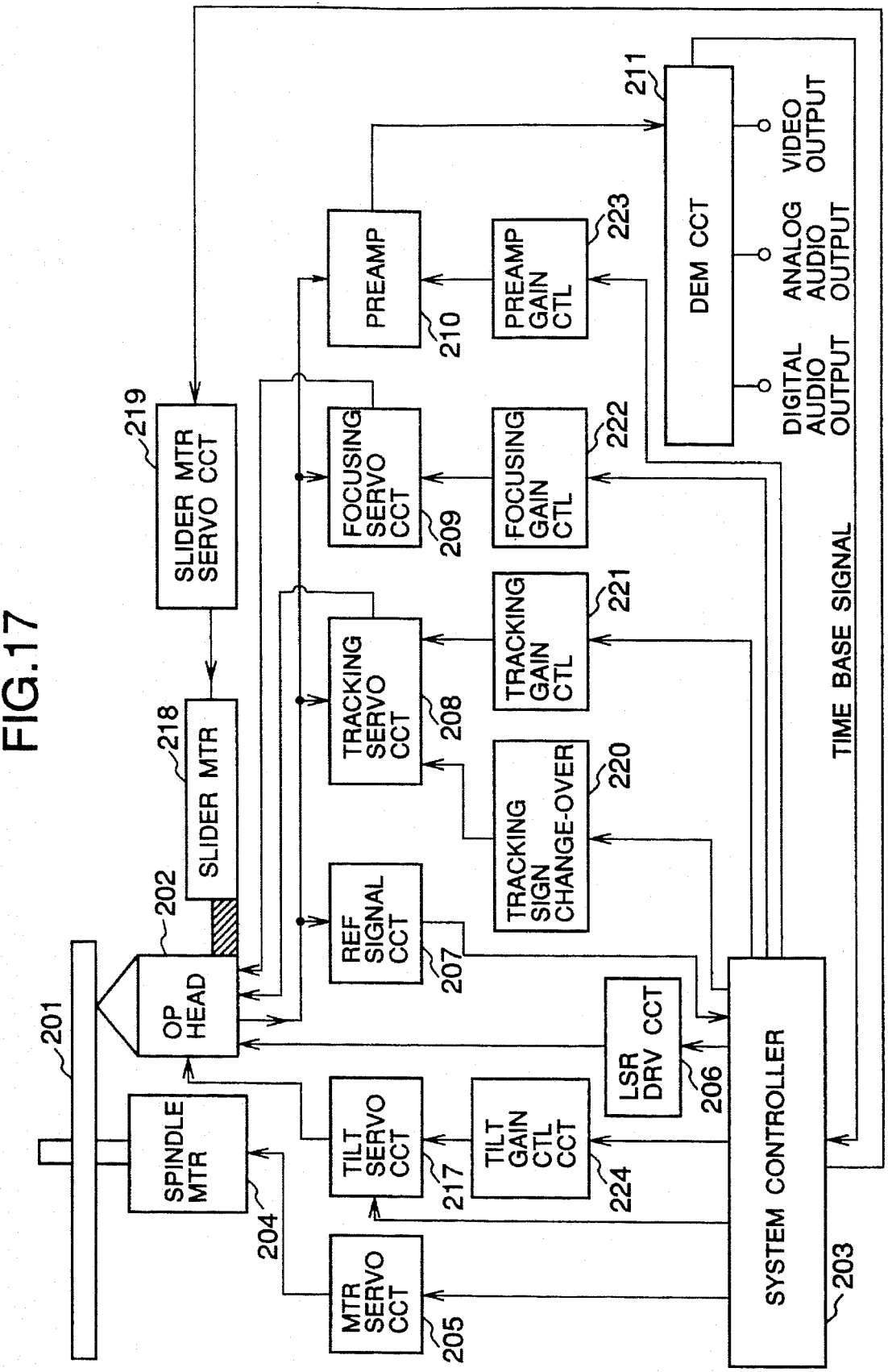
FIG. 17 is a block diagram of another example of the optical disk player unit according to the present invention.

FIG. 17 is a block diagram of another example of a player or reproducer unit (5 in FIG. 1) in this embodiment.

Referring to FIG. 17, information recorded on an optical disk 201 which is rotated by a spindle motor 204 is detected by an optical head 202. The optical head 202 is positioned by a slider motor 218, and it irradiates the optical disk 201 with a semiconductor laser beam and then detects reflected light from the optical disk.

The reflected light detection signal of the optical head 202 is sent to a system controller 203 through a reflection signal circuit 207. It is also supplied to a tracking servo circuit 208, a focusing servo circuit 209 and a preamplifier 210.

The system controller 203 generates gain control signals for a tracking gain control circuit 221, a focusing gain control circuit 222, a preamplifier gain control circuit 223 and a tilt gain control circuit 224 in accordance with the output of the reflection signal circuit 207, and it sends the respective gain control signals to the corresponding gain control circuits. Therefore, the levels of output signals from the tracking servo circuit 208, the focusing servo circuit 209, the preamplifier 210 and a tilt servo circuit 217 are always set at appropriate levels irrespective of the intensity of the reflected light.

Incidentally, the tilt servo circuit 217 controls the laser beam projection angle of the optical head 202 in accordance with the tilt or inclination of the optical disk 201.

Since the signal levels of the several servo loops are controlled to the appropriate values by the gain settings, the objective lens of the optical head 202 is pulled into its focusing position, and a tracking servo comes to operate normally. Also, the output signal level of the preamplifier 210 becomes the appropriate value, and a video output, a digital or analog audio output and a time base signal as predetermined are delivered from a demodulation circuit 211.

In addition, while monitoring the time base signal, the system controller 203 sends control signals to a spindle motor servo circuit 205 and a slider motor servo circuit 219 so as to control the rotation of the spindle motor 204 and the slider motor 218.

Any of an AGC (automatic gain control), a discontinuous gain change-over, etc., can be adopted for the above gain controls.

The simplest way to change over the gains is as follows. In the case of the LD, the gain control is not performed, and the various servo circuits and the preamplifier 210 are respectively operated with their initialized gains. In contrast, the gains are changed over in the case of the writable optical disk which is different from the LD.

First, let's consider the case where the LD (exhibiting a reflectance of 70 [%] or above) has been set as the optical disk 201. In this case, the objective lens is pulled into the focusing position, and the reflection signal circuit 207 which receives the signal of the reflected light from the optical disk 201 detects the reflectance of at least 70 [%]. Then, the system controller 203 decides the set optical disk 201 to be the LD, and it does not deliver the gain change-over command signals. Accordingly, the various servo circuits and the preamplifier 210 operate with their initialized gains. On the other hand, in the case where the reflectance of the optical disk 201 is 30 [%] or below, the system controller 203 decides this optical disk to be the writable optical disk, and it delivers the command signals for setting the gains of the various servo circuits and the preamplifier 210 to approximately 2.5 times their initialized values.

Incidentally, the resolving power of the reflection signal circuit 207 may well be enhanced so as to change over the gains in more stages. Also, one or more of the gain control circuits 221–224 can be omitted under some circumstances. In FIG. 17, numeral 206 indicates a laser drive circuit, and numeral 220 a tracking polarity or sign change-over circuit.

Next, a tracking polarity change-over method in the embodiment shown in FIG. 17 will be explained in detail with reference to FIGS. 18 and 19.

Figure 18:
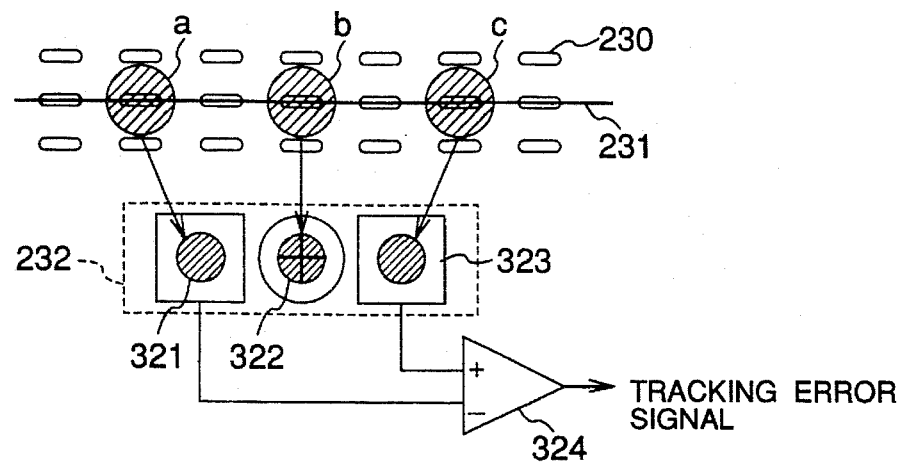
FIG. 18 is a diagram for explaining the tracking state of light spots on an optical disk.
Figure 19:
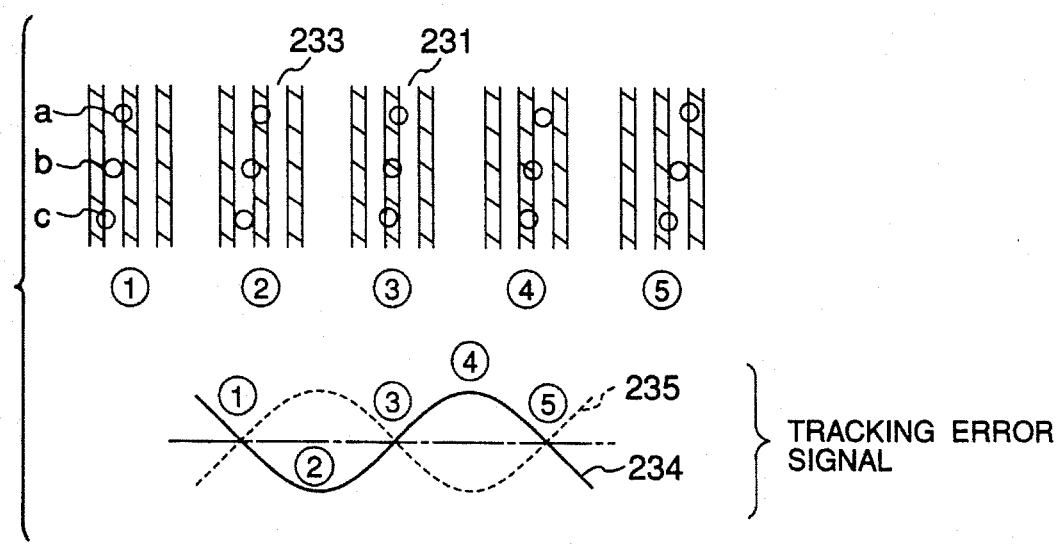
FIG. 19 is a waveform diagram of a tracking error signal on the optical disk.

FIGS. 18 and 19 are diagrams for explaining the principle of a 3-spot tracking technique which is extensively adopted in LD players.

Referring to FIG. 18, three information tracks 231 extend in a lateral direction. Each of the information tracks 231 has information signal pits 230, and is irradiated with three light spots a, b and c. The light spot b is used for focusing and the detection of the information signal pits 230, while the light spots a and c are used for tracking.

Light rays reflected from the light spots a and c are respectively detected by photodiodes 321 and 323 in a photodiode array 232, and a difference signal of both the detected signals is produced by a differential circuit 324. The difference signal is a tracking error signal, and the tracking control functions so as to render this signal null.

Numerals 234 and 235 in FIG. 19 indicate the varying waveforms of the tracking error signal. The tracking error signal waveforms 234 and 235 vary sinusoidally as shown in the figure. The positions ①–⑤ of these waveforms correspond to levels in the respective cases where the spots a, b and c lie at positions shown by symbols ①–⑤ at the upper part of FIG. 19 relative to the information tracks 231 and guard bands 233 (unrecorded parts between adjacent information tracks).

The tracking error signal waveform 234 (the solid line) represents a case where the quantity of the reflected light from the guard band 233 is larger than that of the reflected light from the information track 231, whereas the tracking error signal waveform 235 (the broken line) represents the reverse case.

An exact tracking position is the position ③, and the tracking servo loop is controlled to be either a negative feedback loop or a positive feedback loop in accordance with the gradient of the tracking error signal waveform at this point.

Assuming by way of example that the part ③ of the waveform 234, namely, the part of the waveform 234 having a rightward rising gradient is a negative feedback region, the parts ① and ⑤ become the negative feedback regions in the waveform 235. On the other hand, the part of the waveform 234 or 235 having a leftward rising gradient is a positive feedback region. Since the light spots cannot stay in the positive feedback region, they jump out of this positive feedback region and settle down at the midpoint of the negative feedback region. Thus, the tracking servo loop automatically settles down at the position ③ in the case of the waveform 234 and at the position ① or ⑤ in the case of the waveform 235.

Since, however, the exact tracking position is the position ③, the waveform 235 needs to have its phase inverted to obtain the waveform 234 when the tracking servo loop has settled down at the position ① or ⑤.

To this end, in the present invention, the waveforms 234 and 235 are discriminated by utilizing the discrepancy of signal intensities at the tracking position ③ and the tracking position ① or ⑤, whereupon the phase inversion is performed if necessary.

The signal intensities are discriminated by exploiting the amplitude variation of an RF (radio-frequency) signal which is contained in the output of a photodiode 322 in the photodiode array 232 shown in FIG. 18. The RF signal is generated by an output level variation in the case where the light spot b passes through the information pit 230. Therefore, the RF signal reaches a maximum when the light spot b lies at the position ③, and it decreases when the light spot b lies at the position ① or ⑤.

Figure 20:
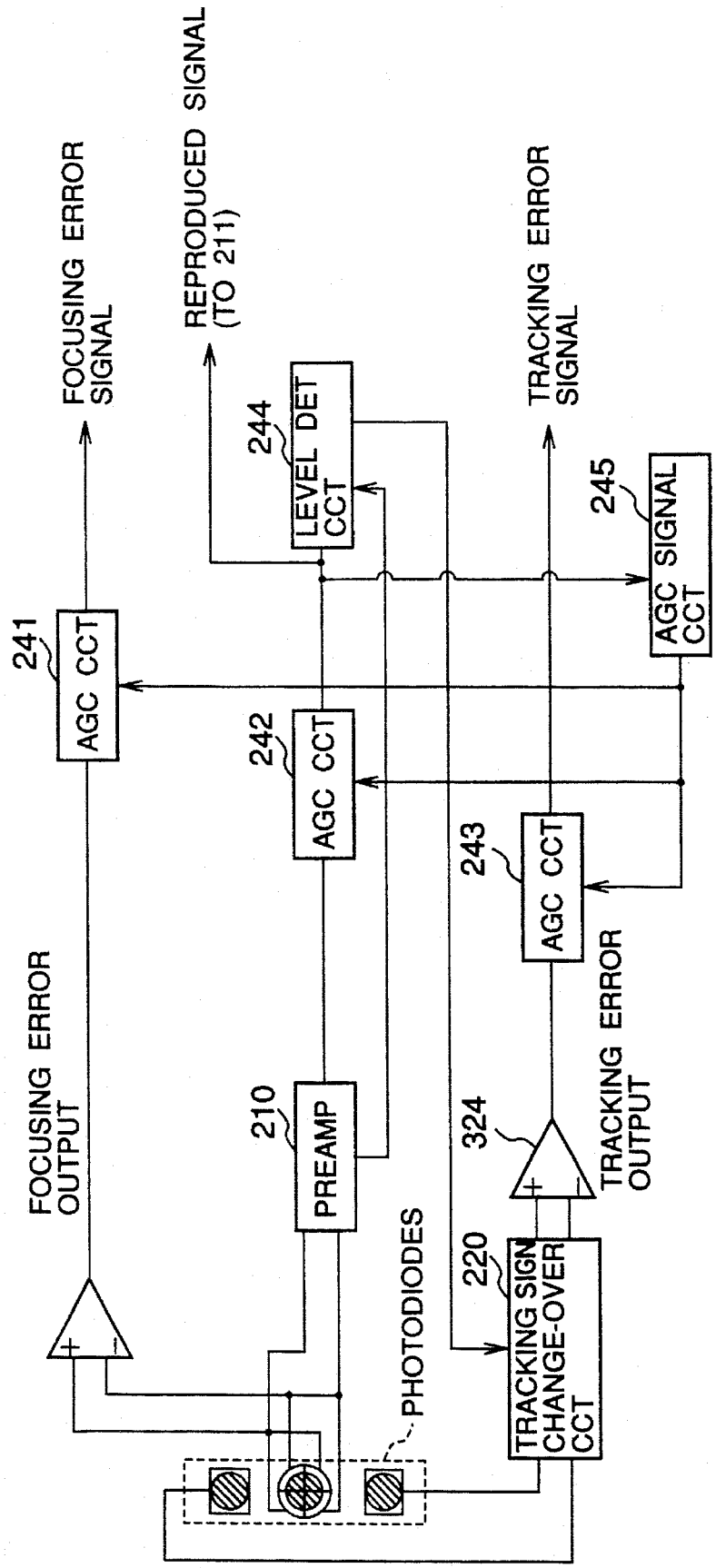
FIG. 20 is a partial block diagram of still another example of the optical disk player unit according to the present invention.

FIG. 20 is a block diagram of an example of a part of the player unit in which the phase inversion is effected automatically and properly by exploiting the amplitude variation of the RF signal.

Referring to FIG. 20, an AGC circuit 242 corresponds to the preamplifier gain control circuit 223 shown in FIG. 17. The output of the AGC circuit 242 is sent to the preamplifier 210 shown in FIG. 17, and is also applied to a level detection circuit 244. The tracking error signal is derived via the tracking polarity or sign change-over circuit 220, the differential circuit 324 and an AGC circuit 243. The AGC circuit 243 corresponds to the tracking gain control circuit 221 shown in FIG. 17, and an AGC circuit 241 corresponds to the focusing gain control circuit 222 shown in FIG. 17.

The level detection circuit 244 detects and stores the amplitude of the RF signal at a first tracking position. Subsequently, the level detection circuit 244 causes the tracking polarity change-over circuit 220 to change over the tracking polarity, and it detects the amplitude of the RF signal at a new tracking position on that occasion. When the newly detected amplitude value is larger than the amplitude value stored before, the level detection circuit 244 regards the new position as a correct tracking position and allows the tracking operation to continue without acting on the circuit 220. On the other hand, when the newly detected amplitude value is smaller, the level detection circuit 244 sends a polarity inversion signal to the tracking polarity change-over circuit 220 so as to restore the tracking position to the original position and then allows the tracking operation to continue.

By way of example, let's consider a case where the first tracking position is the position ③ in FIG. 19, that is, where the tracking error signal is in the waveform 234. In this case, when the tracking polarity is inverted, the tracking error signal falls into the waveform 235, and the tracking position moves to the position ① or ⑤. Accordingly, the RF signal amplitudes at the tracking position ③ and at the tracking position ① or ⑤ can be detected and compared by inverting the tracking polarity. Thus, the tracking operation can be set at the tracking position which has the larger RF signal amplitude.

In the example of FIG. 20, an AGC signal to be applied to the respective AGC circuits 241–243 of the focusing loop, reproduced signal loop and tracking loop is produced by an AGC signal circuit 245 which detects and rectifies the output of the AGC circuit 242 and amplifies the rectified output if necessary.

Alternatively, the AGC signal may be produced from the focusing error signal.

Also, the AGC signal can be produced by the system controller 203 from the reflected light detection signal after it passes through the reflection signal circuit 207 as illustrated in FIG. 17.

In the above example, the RF signal levels at the change-over of the tracking polarities are compared. The polarity change-over, however, can also be effected by another method.

When the tracking is at the-position ③ in FIG. 19, the light spot b traces the information track 231 correctly, and hence the normal time base signal is derived from the demodulation circuit 211 in FIG. 17. In contrast, when the tracking is at the position ① or ⑤, the light spot b deviates from the information track 231, and hence the demodulation circuit 211 does not deliver the correct time base signal.

Accordingly, the polarity of the tracking can be controlled by monitoring the time base signal with the system controller 203 in FIG. 17, and when the time base signal is correct, continuing the tracking as it is, and when the time base signal is incorrect, sending a change-over signal to the tracking polarity change-over circuit 220.

The time base signal contains signals of high regularity, such as sync signals and address data. Therefore, any of these signals can be used as a signal for monitoring the time base signal.

It is also possible to utilize error information, for example, a frame error rate, instead of the time base signal.

A player or reproducer for, e.g., a CD or an optical disk for digital information is usually provided with an error correction circuit which has a high error correction capability. Therefore, the frame error rate is very low while the information track 231 is being tracked, whereas it increases drastically while the guard band 233 is being tracked.

Accordingly, the tracking polarity change-over circuit 220 can be actuated for change-over using the value of the frame error rate as an index. Since the error correction circuit is included in the demodulation circuit 211 shown in FIG. 17, the frame error rate signal is sent from this error correction circuit to the system controller 203, from which the change-over signal is sent to the tracking polarity change-over circuit 220.

In each of the above examples, the amplitudes of the reproduced signal at the two tracking positions are compared, whereupon the correct tracking position is maintained or established.

Alternatively, however, the correct tracking position can be found on the basis of reflectance information from the information track 231 and the guard bands 233.

More specifically, at the start-up of the optical disk (201 in FIG. 17), the tracking does not stabilize or settle down for a while after the stabilization of the focusing, so that the light spot (b in FIGS. 18 and 19) is moving across the information track 231 and the guard band 233. Also, when the tracking servo loop has been turned "off", the light spot similarly moves across the information track 231 and the guard band 233.

Figure 21:
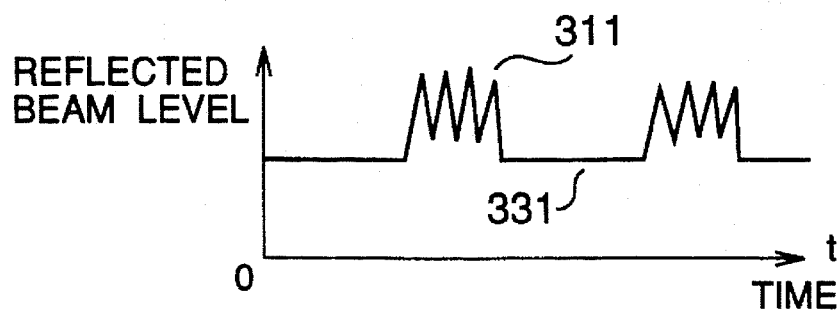
FIG. 21 is a waveform diagram of light intensities reflected from an information track and a guard band on an example of the optical disk.
Figure 22:
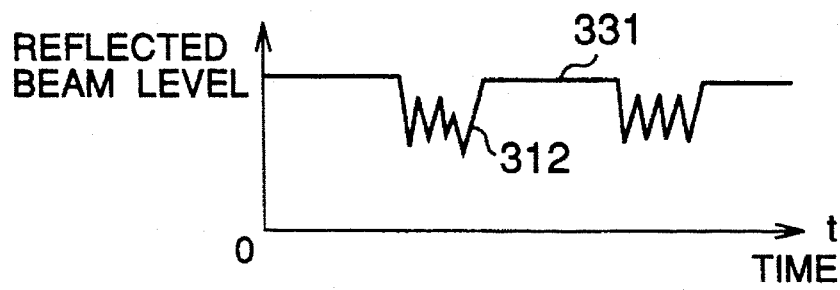
FIG. 22 is a waveform diagram of light intensities reflected from an information track and a guard band on another example of the optical disk.

In such a state, the level of the reflected light from the optical disk varies as illustrated in FIG. 21 or FIG. 22. Numeral 311 or 312 indicates the level of the reflected light from the information track 231, and this reflected light contains high frequency components based on the recording of information. Numeral 331 indicates the level of the reflected light from the guard band 233.

FIG. 21 corresponds to the case where the reflectance of the information track 231 is higher than that of the guard band 233. In this case, the reflected light level increases when the light spot crosses the information track 231. As shown in FIG. 22, in the case where the reflectance of the information track 231 is lower than that of the guard band 233, the reflected light level decreases when the light spot crosses the information track 231. Accordingly, the reflectances of the information track 231 and the guard band 233 can be decided on the basis of the relationship of the levels of the light reflected from these parts 231 and 233, and the tracking polarity or sign change-over circuit 220 can be controlled in accordance with the decided reflectances.

Figure 23:
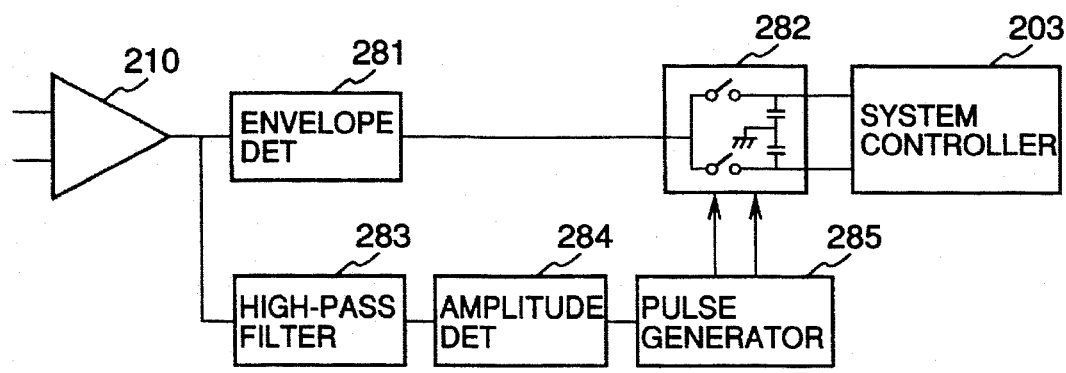
FIG. 23 is a block diagram of an example of a tracking sign discriminator circuit for use in the present invention.
Figure 24:
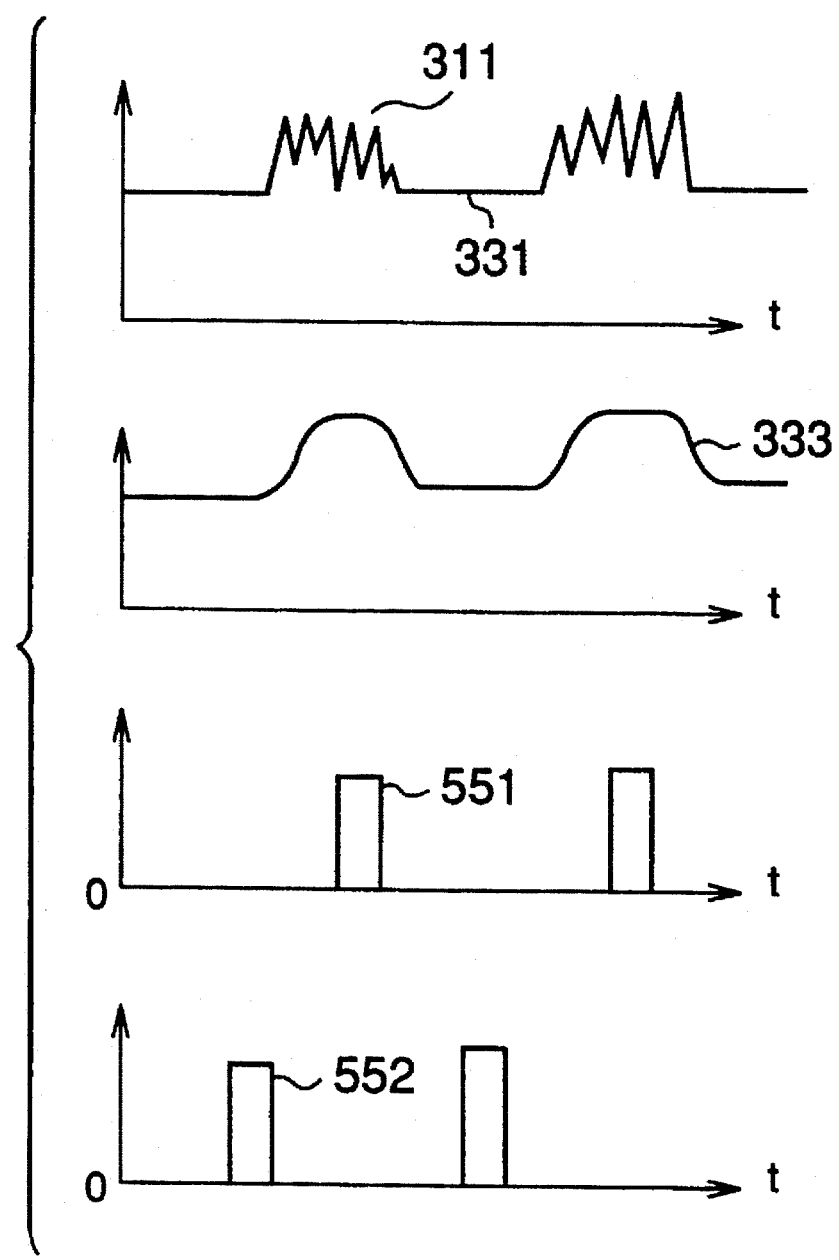
FIG. 24 is a diagram showing the waveforms of signals at several locations in FIG. 23.

FIG. 23 illustrates an example of a circuit which is required for the decision of the reflectance, and which corresponds to the reflection signal circuit 207 in FIG. 17 or the level detection circuit 244 in FIG. 20. In addition, FIG. 24 illustrates waveforms at several locations in the circuit in FIG. 23.

The output of the preamplifier 210 is subjected to envelope detection by an envelope detection circuit 281 shown in FIG. 23. By way of example, in a case where the output waveform of the preamplifier 210 is as shown in FIG. 21, the waveform 333 depicted in FIG. 24 is obtained. The portion 311 of the output of the preamplifier 210 is extracted by passing the output of the preamplifier 210 through a high-pass filter 283. Therefore, when the portion 311 is detected by an amplitude detection circuit 284, pulses 551 and 552 for sampling can be produced by a pulse generator 285. As a result, a sampling circuit 282 can produce the reflectance detection signals of the information track 231 and the guard band 233 and then send them to the system controller 203.

Although the foregoing embodiments have been described with respect to video and audio signals, the present invention is not restricted thereto, but it is also capable of recording digital data instead of the digital audio signal. In this case, the disk can be controlled on the basis of the data (including programs), and the application of the present invention widens. Especially in the fields of presentation, etc., where the number of disks to be used is limited, the optical disk system according to the present invention becomes the most suitable for recording the digital data.

The present invention provides various effects as stated below.

When video software is produced, a recorded disk is obtained on the basis of the software. The recorded disk and a read only type optical disk can be reproduced by the same player or reproducer. Therefore, users of the optical disk system of the present invention can produce an original video disk by themselves, while they can effectively utilize a software stock of read only type optical disks. Moreover, since the recorded disks can be prepared in real time, a time period for preparing the disks is much shorter than that for preparing the read only type optical disk. Further, although large-scale equipment such as a clean room is required for preparing the read only type optical disk such as an LD (laser disk), the optical disk system according to the present invention can prepare the recorded disk from a blank or unrecorded disk in an ordinary office environment merely by installing a small-sized recording device.

In addition, since the compatible player for reproducing the recorded disk and the read only type optical disk can make an optical head and an image processing circuit common to both types of disks, it can be provided at a low cost.

Furthermore, the signal levels of an information reproducing circuit, a tracking circuit, a focusing circuit, etc., are maintained constant irrespective of the type of optical disk by the AGC (automatic gain control) or gain change-over of the respective circuits, and a tracking position is automatically set to a correct one by selecting a tracking polarity. Therefore, the writable optical disk and the read only type optical disk can be driven by the 3-spot type tracking and focusing control loops of a reproducing apparatus.

What is claimed is:

1. An optical disk recording system employing a writable optical disk for video use, the optical disk recording system characterized in that information is recorded on the writable optical disk which exhibits a C/N (carrier-to-noise) ratio of at least 60 dB under conditions of a signal frequency of 8 MHz and a noise band of 30 kHz, in the same recording format as that of a read only type optical disk;

wherein said read only type optical disk is an LD (laser disk) on which an NTSC (National Television System Committee) signal is recorded, and the recording format of said writable optical disk for recording the information is NTSC direct FM (frequency modulation) recording in which the NTSC signal is directly subjected to frequency modulation; and wherein said system includes:

a video software reproducing unit which includes at least one device selected from the group consisting of an LD player, a VTR (video tape recorder) for home use, a VTR for business use and other video equipment;

a record signal generating unit which affixes control code data peculiar to an LD (laser disk) being said read only type optical disk, to a reproduced output signal from said video software reproducing unit, and then subjecting the resulting signal to frequency modulation; and a recording unit which records a record signal from said record signal generating unit, on said writable optical disk as said information.

2. An optical disk recording system according to claim 3, wherein said video software reproducing unit includes erase means for removing address signals and the control code data peculiar to said LD, from the reproduced signal of said LD player.

3. An optical disk recording system according to claim 1, wherein said video software reproducing unit includes timebase error correction means for correcting a sync signal which is contained in the reproduced signal of said VTR for home use.

4. An optical disk reproducing system for reproducing both a read only type optical disk and a writable optical disk, the writable optical disk having been recorded by an optical disk recording system employing a writable optical disk for video use, the optical disk recording system characterized in that information is recorded on the writable optical disk which exhibits a C/N (carrier-to-noise) ratio of at least 60 dB under conditions of a signal frequency of 8 MHz and a noise band of 30 kHz, in the same recording format as that of the read only type optical disk said optical disk reproducing system comprising identification means for identifying said read only type optical disk and said writable optical disk, so as to change-over polarities and gains of tracking operations for said optical disks in accordance with signals from said identification means.

5. An optical disk reproducing system according to claim 4, further comprising a tilt sensor which detects a tilt of said optical disk, said identification means identifying said optical disk by the use of an output signal from said tilt sensor.

6. An optical disk reproducing system according to claim 4, further comprising an optical head for reproduction, said identification means identifying said optical disk by the use of an output signal which is proportional to disk reflection light delivered from said optical head.

7. An optical disk reproducing system according to claim 4, further comprising a tracking control circuit which changes-over the tracking polarity and increases the tracking gain separately.

8. An optical disk reproducing system according to claim 4, further comprising a tracking control circuit which changes-over the tracking polarity and simultaneously increases the tracking gain.

9. An optical disk reproducing system wherein an optical disk is irradiated with three laser beam spots, and a reflected light ray of the first beam spot is used for performing a focusing control and for reproducing information, while reflected light rays of the second and third beam spots are used for performing a tracking control; comprising:

a tracking polarity change-over circuit; and tracking decision means;

said tracking decision means including means for controlling said tracking polarity change-over circuit so as to invert polarities of tracking signals, and for comparing high frequency components which are contained in reproduced signals of the information in both the tracking polarities and then selecting and fixing the tracking polarity in which the high frequency components are most intense.

10. An optical disk reproducing system wherein an optical disk is irradiated with a laser beam, and reflected light from the optical disk is used for reproducing information and also for performing follow-up controls of tracking and focusing, comprising:

a tracking polarity change-over circuit; and tracking decision means;

said tracking decision means including means for controlling said tracking polarity change-over circuit so as to invert polarities of tracking signals, and for detecting fixed pattern signal components selected from the group consisting of time base signals and address signals which are contained in reproduced signals of the information in both the tracking polarities and then selecting and fixing the tracking polarity in which the fixed pattern signal component is stronger.

11. An optical disk reproducing system wherein an optical disk is irradiated with a laser beam, and reflected light from the optical disk is used for reproducing information and also for performing tracking and focusing, comprising:

a tracking polarity change-over circuit; and tracking decision means;

said tracking decision means including means for controlling said tracking polarity change-over circuit so as to invert polarities of tracking signals, and for comparing rates of errors which develop in reproduced signals of the information in both the tracking polarities and then selecting and fixing the tracking polarity in which the error rate is lower.

12. An optical disk reproducing system wherein an optical disk having a plurality of information tracks and a plurality of guard bands is irradiated with a laser beam, and reflected light from the optical disk is used for reproducing information and also for performing tracking and focusing, comprising:

a tracking polarity change-over circuit; and tracking decision means;

said tracking decision means comparing those reproduced signal levels of the reflected light rays from the information track and the guard band of said optical disk which are obtained in an improper tracking state, so as to control said tracking polarity change-over circuit.

13. An optical disk reproducing system according to claim 12, wherein said tracking decision means includes a high-pass filter for detecting the reproduced signal level of the reflected light ray from said information track.

14. An optical disk system comprising means for splitting high-definition video software in correspondence with a plurality of divisional screens; information being recorded on a plurality of writable optical disks, the writable optical disks having been recorded by at least one optical disk recording system employing a writable optical disk for video use, the optical disk recording system characterized in that information is recorded on the writable optical disk which exhibits a C/N (carrier-to-noise) ratio of at least 60 dB under conditions of a signal frequency of 8 MHz and a noise band of 30 kHz, in the same recording format as that of a read only type optical disk; the writable optical disks being reproduced by a plurality of optical disk reproducing systems each comprising identification means for identifying said read only type optical disk and said writable optical disk, so as to change-over polarities and gains of tracking operations for said optical disks in accordance with signals from said identification means; thereby reproducing the high-definition video software by said plurality of divisional screens.

15. An optical information recording medium comprising:

a substrate; and a recording layer disposed on the substrate;

wherein the recording layer includes a first layer having a first surface and a second surface, and a second layer having a first surface and a second surface, the first surface of the second layer being in contact with the second surface of the first layer, the first surface of the first layer being a surface for receiving a recording light beam in a recording mode and a reproducing light beam in a reproducing mode;

wherein in an unrecorded portion of the recording layer, the first layer is transparent and the first surface of the second layer is reflective;

wherein when the recording light beam is incident on an unrecorded portion of the recording layer, the first layer and the second layer are alloyed together to form a recorded portion having a first surface substantially coincident with the first surface of the first layer and a second surface substantially coincident with the second surface of the second layer, the first surface of the recorded portion being reflective;

wherein when the reproducing light beam is incident on an unrecorded portion of the recording layer, the reproducing light beam enters the first surface of the first layer, passes through the first layer, is reflected by the first surface of the second layer, passes back through the first layer, and emerges from the first surface of the first layer;

wherein when the reproducing light beam is incident on a recorded portion of the recording layer, the reproducing light beam is reflected by the first surface of the recorded portion;

wherein when a recorded portion is formed from an unrecorded portion, an optical phase change occurs, the optical phase change being determined by a distance between the first surface of the second layer and the first surface of the recorded portion; and wherein the first layer and the second layer are selected such that the optical phase change increases a difference between a reflectance of the recorded portion and a reflectance of the unrecorded portion.

16. An optical information recording medium comprising:

a substrate having a surface, the surface having tracking grooves formed therein, the tracking grooves being separated from each other by lands, the lands constituting recording areas of the optical information recording medium; and a recording layer disposed on the surface of the substrate having tracking grooves formed therein;

wherein a portion of the recording layer on a selected one of the lands is irradiated with a light beam during a recording mode, thereby either (1) changing a reflectance of the portion of the recording layer from a low reflectance having a phase $\phi l$ to a high reflectance having a phase $\phi h$ or (2) changing a reflectance of the portion of the recording layer from a high reflectance having a phase $\phi h$ to a low reflectance having a phase $\phi l$; and wherein the recording layer is selected to provide the relation $\phi h > \phi l$.

17. An optical information recording medium comprising:

a substrate having a surface, the surface having tracking grooves formed therein, the tracking grooves being separated from each other by lands, the grooves constituting recording areas of the optical information recording medium; and a recording layer disposed on the surface of the substrate having tracking grooves formed therein;

wherein a portion of the recording layer in a selected one of the grooves is irradiated with a light beam during a recording mode, thereby either (1) changing a reflectance of the portion of the recording layer from a low reflectance having a phase $\phi l$ to a high reflectance having a phase $\phi h$ or (2) changing a reflectance of the portion of the recording layer from a high reflectance having a phase $\phi h$ to a low reflectance having a phase $\phi l$; and wherein the recording layer is selected to provide the relation $\phi h < \phi l$.

* * * * *